United States Patent [19]

Renzelmann et al.

[11] Patent Number: 5,427,329
[45] Date of Patent: Jun. 27, 1995

[54] LOCKING HYDRAULIC LATCH PIN ACTUATOR

[75] Inventors: Michael E. Renzelmann, Woodinville; Mark H. Smith, Vashon Island, both of Wash.; Gregory T. Stramat, Henderson, Nev.

[73] Assignee: The Boeing Company, Seattle, Wash.

[21] Appl. No.: 45,899

[22] Filed: Apr. 12, 1993

Related U.S. Application Data

[63] Continuation-in-part of Ser. No. 828,308, Jan. 30, 1992, Pat. No. 5,201,479.

[51] Int. Cl.⁶ .................................................. B64C 3/56
[52] U.S. Cl. .......................................... 244/49; 92/23; 92/117 A; 292/144
[58] Field of Search .............. 244/218, 49, 120, 124, 244/102 SL; 292/335, 144, 302; 92/14, 16, 20, 23, 24, 29, 117 A; 116/124; 280/414

[56] References Cited

U.S. PATENT DOCUMENTS

| | | | |
|---|---|---|---|
| 2,280,809 | 4/1942 | Evans | 116/124 |
| 2,320,849 | 6/1943 | Claybourn et al. | 70/265 |
| 2,397,526 | 4/1946 | Bonbright | 244/12 |
| 2,712,421 | 7/1955 | Naumann | 244/49 |
| 2,925,233 | 2/1960 | Dunn et al. | 244/43 |
| 3,347,748 | 10/1967 | Olsson | 92/23 |
| 4,225,004 | 9/1980 | Lipshield | 292/144 |
| 4,335,733 | 6/1982 | Richards | 92/117 A |
| 4,647,089 | 3/1987 | Zangrando | 292/144 |
| 4,669,283 | 6/1987 | Ingehoven | 292/144 |
| 4,778,129 | 10/1988 | Byford | 244/49 |

FOREIGN PATENT DOCUMENTS

| | | | |
|---|---|---|---|
| 903430 | 10/1945 | France | 244/49 |
| 0086210 | 7/1981 | Japan | 92/117 A |
| 418776 | 10/1934 | United Kingdom | 244/49 |

*Primary Examiner*—Galen L. Barefoot
*Attorney, Agent, or Firm*—Glenn D. Bellamy

[57] ABSTRACT

A latch pin actuator (34) for use in connection with an aircraft (10) having folding wings or wing tips (12). The actuator (34) includes housing (38) mountable to a wing portion (12, 16). A latch pin (21) in the form of a hydraulic cylinder is slidably mounted within the housing (38) and on a piston (44) which is fixed to the housing (38). Variable volume fluid chambers (46, 48) are defined in the cylinder body of the latch pin (21). A primary lock member (58) is movable between locked and unlocked positions such that retraction of the latch pin (21) is prevented when the primary lock (58) is in a locked position. In preferred form, a hydraulic actuator (78) is used to move the primary lock member (58) between locked and unlocked positions and to operate a sequencing valve which delivers hydraulic pressure to a chamber (48) of the latch pin (21) after actuation of the primary lock (58). The latch pin actuator (34) may also include a secondary lock member (60) which can be ganged to operate in unison with adjacent latch pin actuators (34).

14 Claims, 15 Drawing Sheets

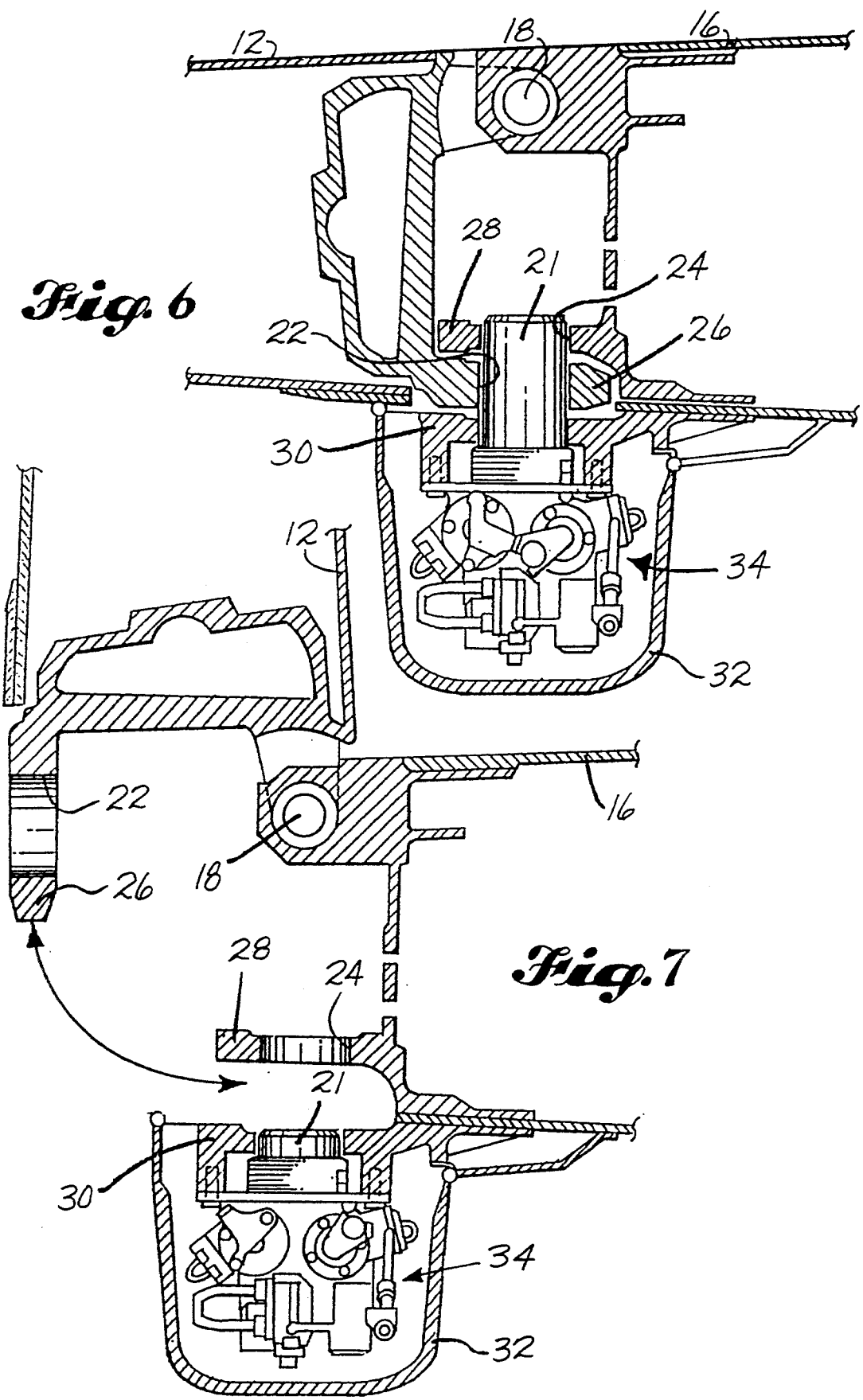

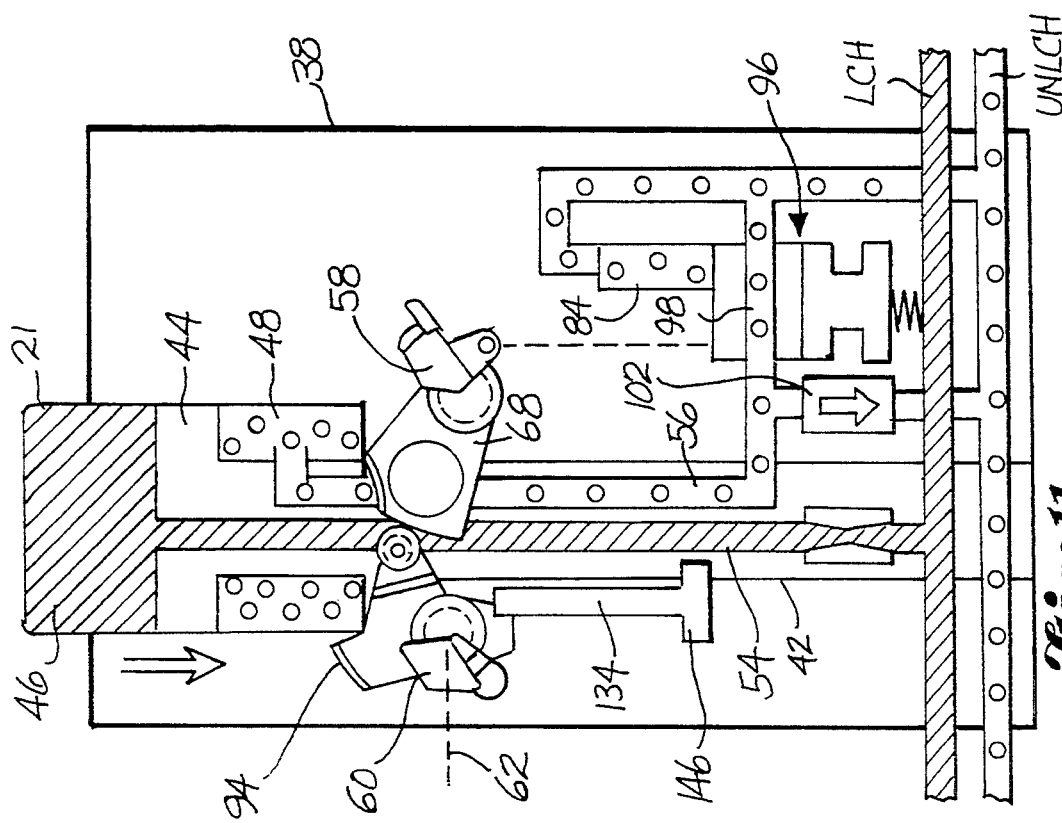
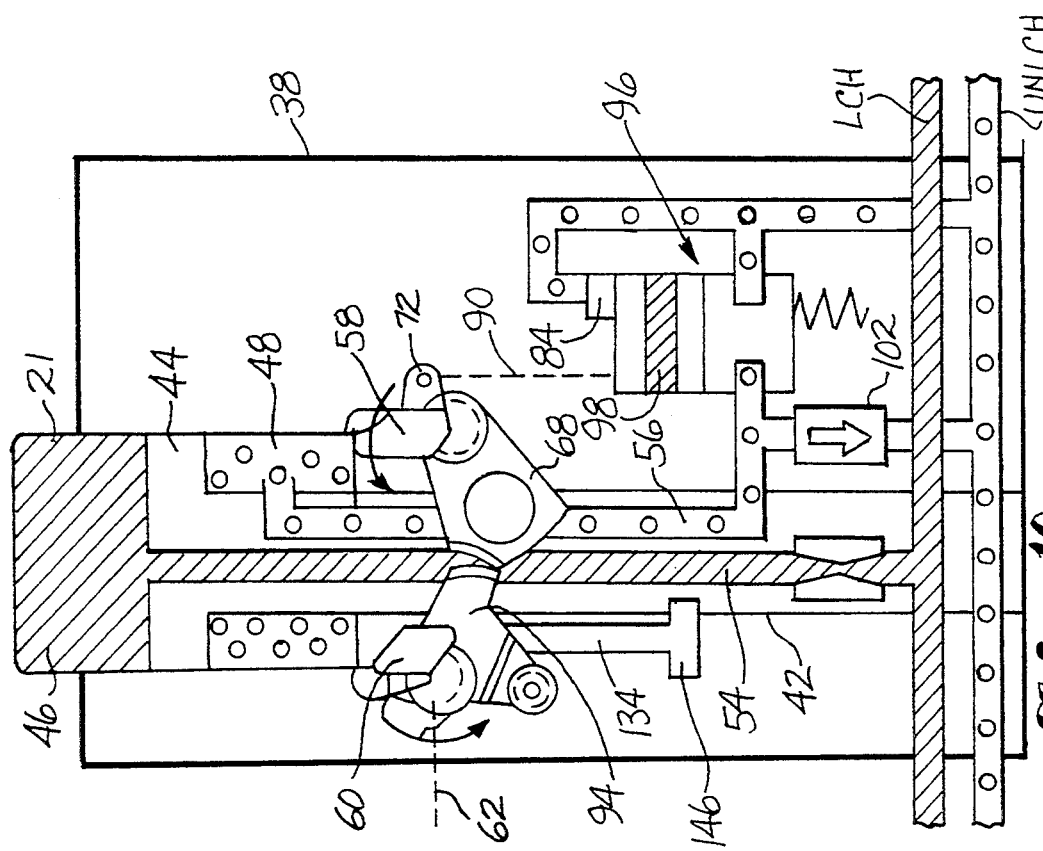

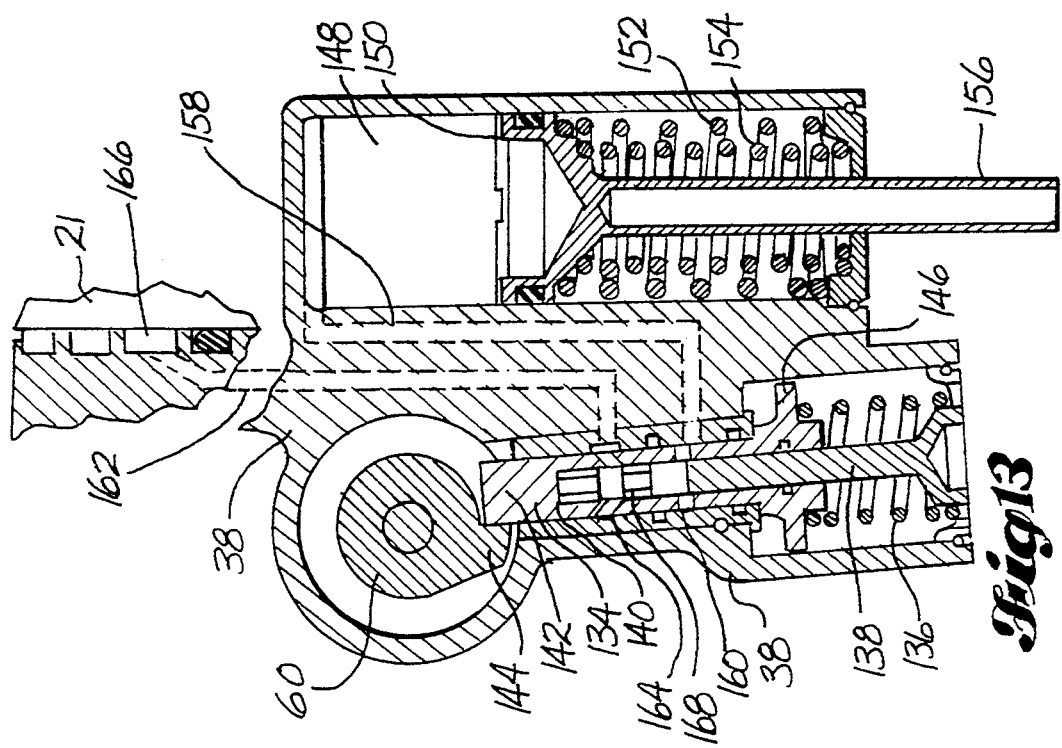
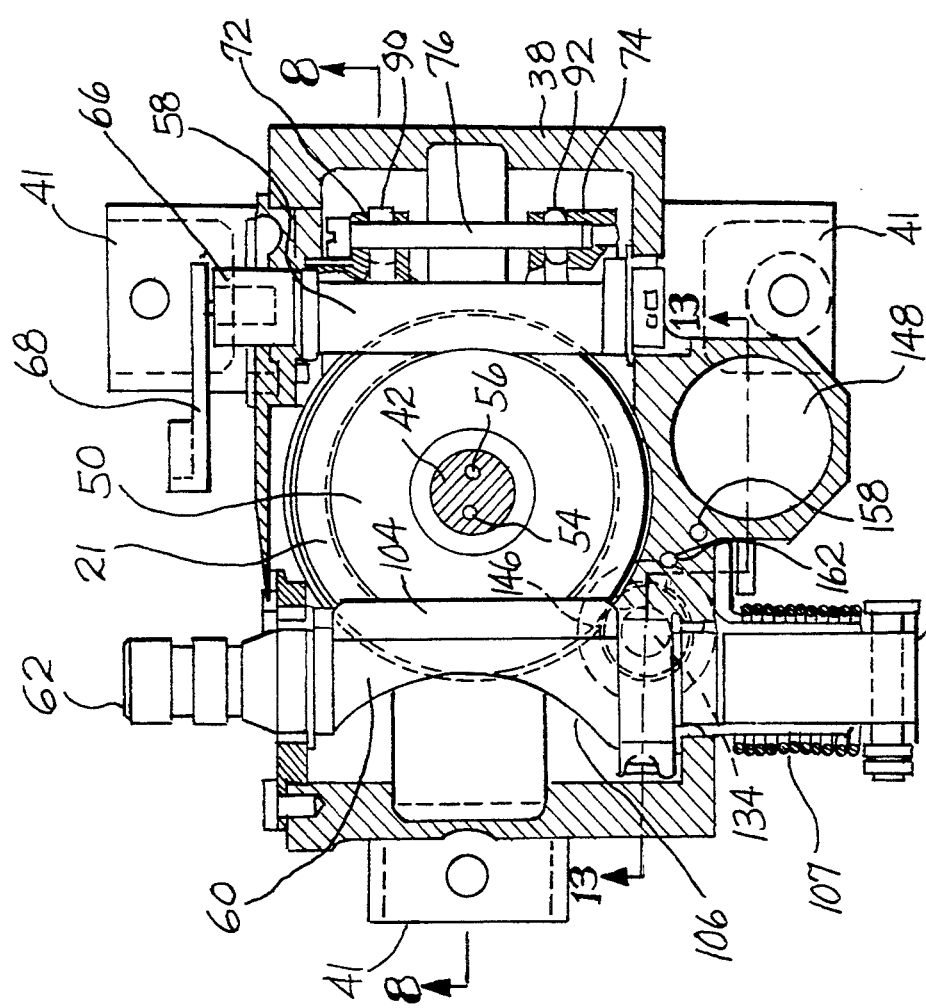

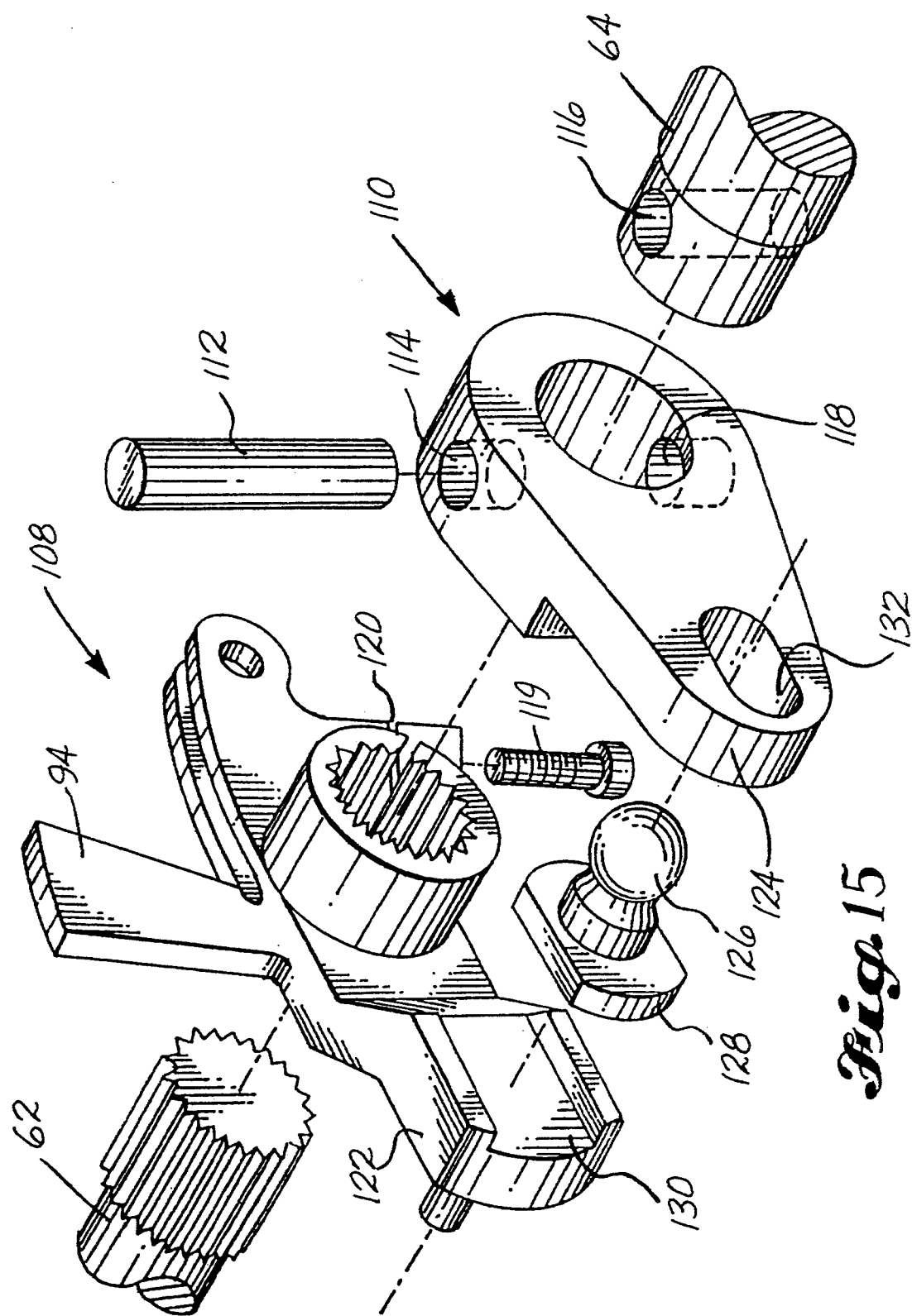

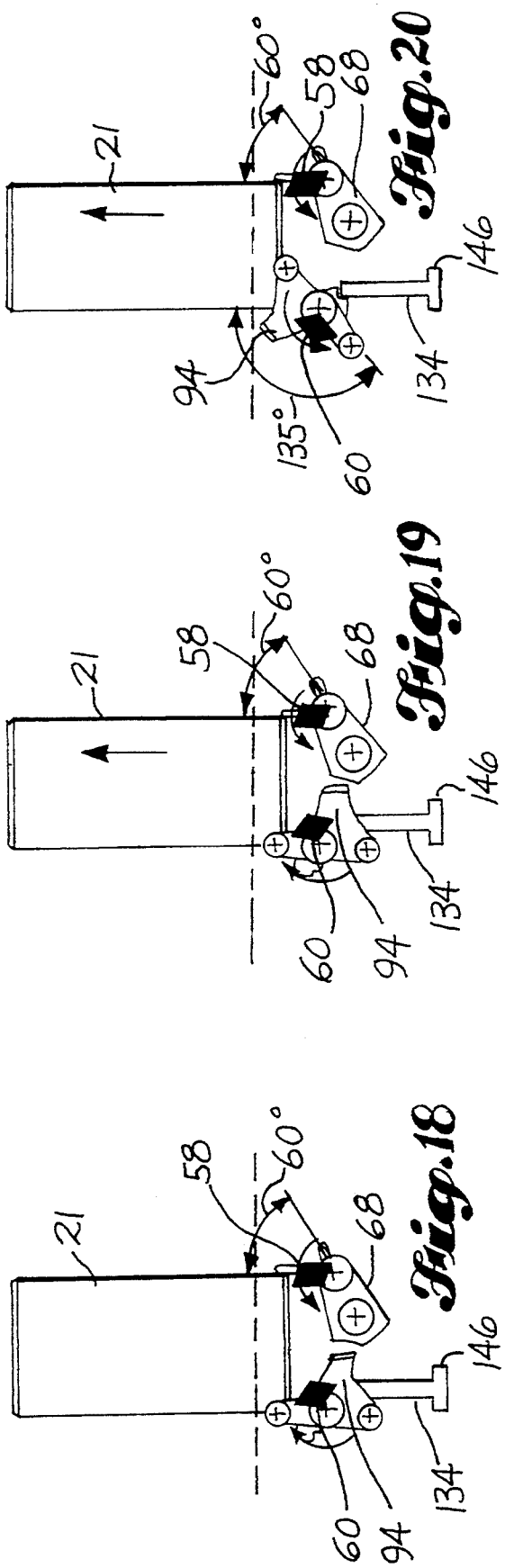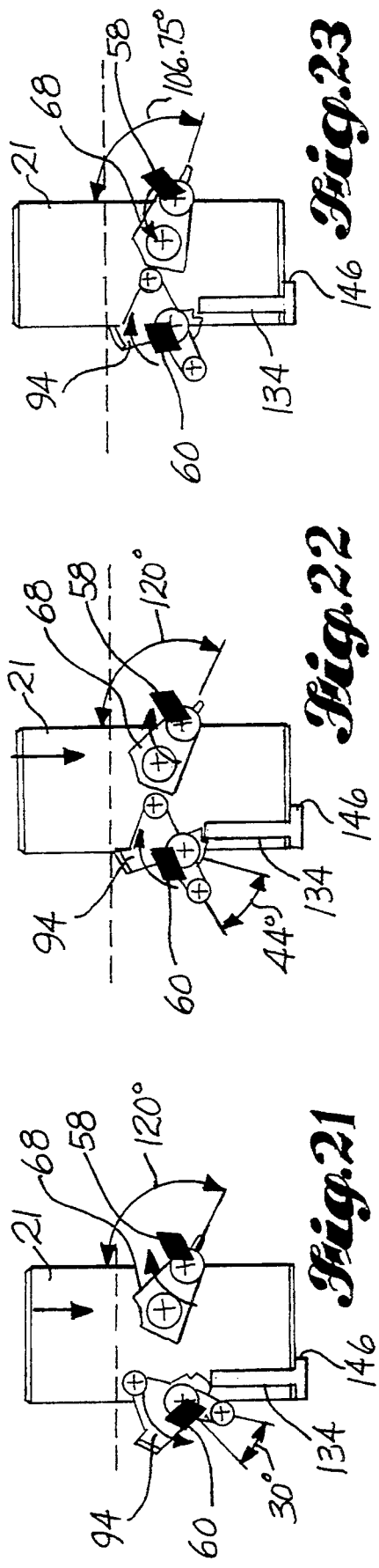

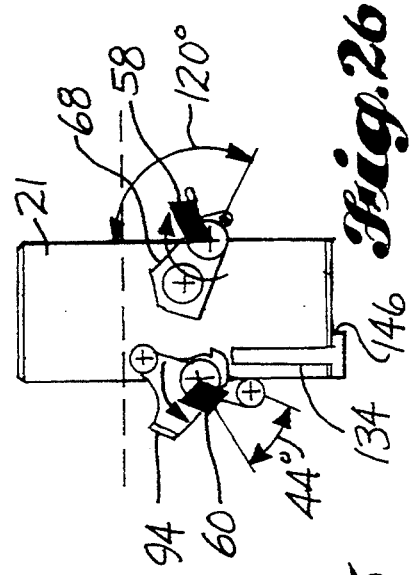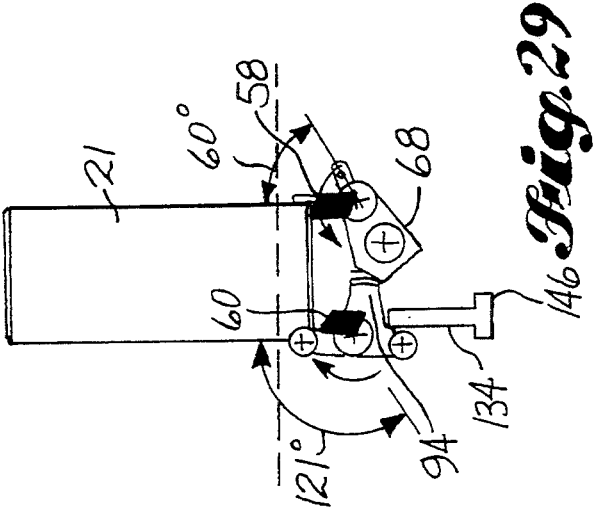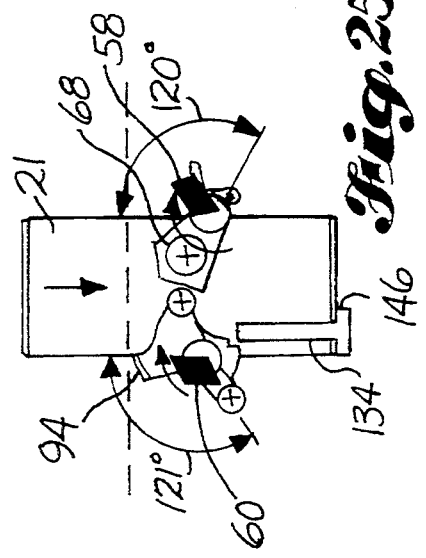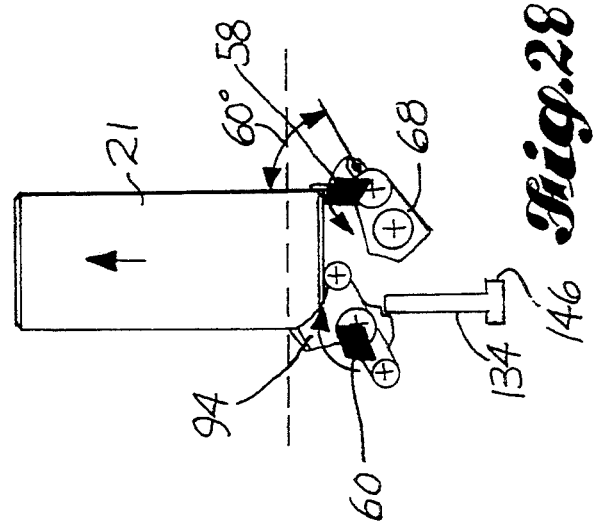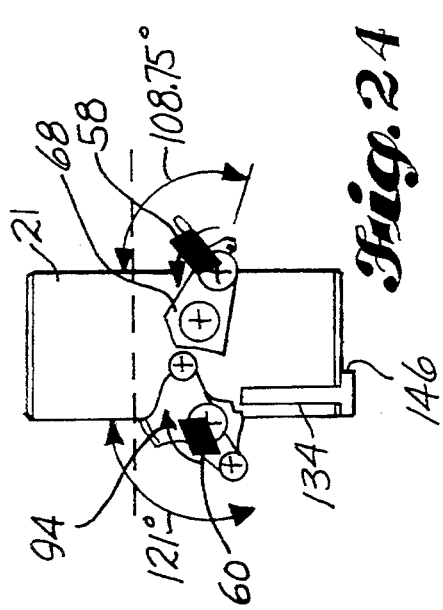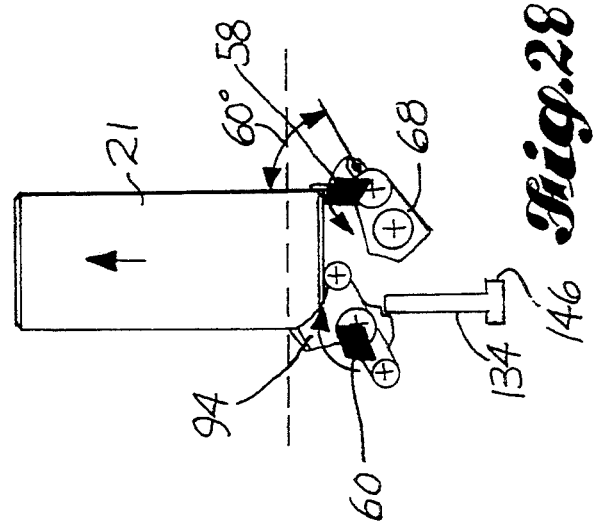

LOCKING HYDRAULIC LATCH PIN ACTUATOR

RELATED APPLICATIONS

The application is a continuation-in-part of co-pending application Ser. No. 07/828,308, filed Jan. 30, 1992, and entitled, "SELF-MONITORING LATCH PIN LOCK FOR FOLDING WING AIRCRAFT," also assigned to The Boeing Company, now U.S. Pat. No. 5,201,479.

TECHNICAL FIELD

This invention relates to a hydraulic latch pin actuator, particularly for such a device which includes primary and secondary locks and may be especially adapted and controlled for use in a folding wing tip aircraft.

BACKGROUND OF THE INVENTION

The concept of folding wing airplanes is commonly associated with fighter aircraft that are stationed onboard aircraft carriers. Because an aircraft carrier has a small flight deck and reduced hanger space compared to ground-based facilities, carrier-based aircraft must have folding wings that reduce their wing span for storage purposes. Providing folding wings on carrier aircraft enables a larger number of planes to be based on a carrier than would otherwise be possible and facilitates rapid movement of planes between flight deck and hanger bay.

The same kind of space considerations have not previously applied to commercial passenger aircraft or jets. As a result, there has been little or no need to have folding wings on commercial planes. The typical airport served by a passenger jet generally has ample space for aircraft maneuvering on the ground, and for parking and passenger ingress and egress. However, for reasons discussed below, this may now be changing.

Current and projected passenger demographics indicate that the use of larger planes are more economical for commercial airlines to operate. Aircraft size alone, however, is not the only factor controlling how commercial airlines move a given passenger volume from point A to point B in the most efficient manner. The major airlines typically have a fixed number of passenger gates at each major airport. Most major U.S. airports have either been built or renovated during the last twenty or thirty years. During such building process, passenger gates were spaced from each other a distance that was generally considered to be optimal given the size and number of aircraft in use at the time. The present trend toward using larger aircraft is accompanied by problems resulting from significantly larger wing spans than the majority of commercial airplanes in use twenty or thirty years ago. This results in fewer airplanes taking up a fixed amount of parking or berth space around the typical terminal and, consequently, reduces the number of usable passenger gates. The end result is that larger airplanes tend to make it more difficult to accommodate airline scheduling that requires a large volume of flights.

Space restriction is becoming a significant problem at modern airports. The folding wings of carrier-based airplanes, discussed above, suggest one solution to this problem. Applying this military aircraft solution to commercial jets, however, presents several logistical problems in order to achieve the inherently higher desired level of safety.

It is well-known that The Boeing Company, the assignee of the invention disclosed and claimed herein, is presently developing a new model of commercial jet designated as the "777." This jet is larger than Boeing's earlier models and, consequently, has a larger wing span. At least one study done by The Boeing Company estimates that there are approximately one hundred thirty usable gates at six major airports for The Boeing 767 and the DC-10. However, only approximately twenty of these same gates would be suitable for use by the 777, because of its larger wing span.

Providing 777 jets with folding wing tips can enable a larger number of this particular airplane model to be parked or placed around a given terminal at the same time. It has been estimated that nearly as many usable gates would be available for a 777 that is modified in this way as are presently available for the 767 and DC-10.

A 777 with folding wing tips would require a latching hinge mechanism for releasably interlocking the wing tip with the inboard portion of each wing. Safety considerations dictate that such system must have the utmost structural integrity and fail-safe operation. As the skilled person would realize, an aircraft with folding wings presents additional design and safety problems that are not present on aircraft with conventional wings. The wings must be designed so that they do not accidentally fold during flight and that the latching and locking mechanism does not falsely indicate "latched and locked" prior to takeoff when that condition is not true.

In military aircraft, latch pins are used to hold each folding wing in place. These are locked by an independently-operated locking mechanism. The common method used to detect whether or not the latch pins are locked is a wing-mounted red "flag" that is driven above the wing contour by mechanical connections when the latch pins are unlocked. When they are locked, the flag is conversely driven below or flush with the wing contour. The pilot or flight crew determines the proper lock state merely by viewing the position of the flag. For high reliability, the flag is driven directly by the mechanism that locks the latch pins, with a minimum of interconnections. This necessitates physically locating the flag close to the locking mechanism.

Design safety for military aircraft is, by necessity, viewed differently than for civilian aircraft. Military operations typically require optimum airplane performance in order to provide the pilot with the best chance of survival. Military airplane design anticipates that more pilots are lost as a result of combat than equipment failure. Hence, safety considerations are balanced with combat performance considerations. Since combat is not a consideration in the commercial arena, design safety takes on the utmost importance.

The FAA is the government agency that is responsible for closely regulating commercial aircraft design in the United States. Although the FAA is not known to have considered the use of the above-described winglocking technique used by the military for commercial aircraft, the type of fail-safe operation required by both The Boeing Company and the FAA may not be met. One known drawback to the military design is that the position of the flag does not necessarily provide an indication as to the integrity of the locking mechanism itself. Another drawback to the military design is that it is not particularly well-suited for most modern commercial jets, simply because the wings of such jets are not visible to the flight crew. Therefore, using a similar mechanical flagging technique in connection with the 777 folding wing tip would probably place an unacceptable operating burden on the airline that operates the plane.

The Boeing Company has designed a folding wing tip latching and locking mechanism which meets or exceeds the above-discussed safety considerations in an efficient and cost-effective manner. One aspect of the mechanism is that the hinge of the wing tip is latched into a spread position by a series of latch pins which extend through aligned openings in a clevis and spade connection. Each latch pin is then locked into place by independently-operated primary locks and a mechanically-linked series of secondary locks. The secondary locks are rotated between locked and unlocked positions by an independent hydraulic power drive unit.

SUMMARY OF THE INVENTION

The present invention is intended for use on an aircraft having folding wing tips, where an end portion of each aircraft wing is hingedly connected to an inboard portion of the wing. When the wing tip is swung to a spread position, it and the inboard portion of the wing together form a contiguous airfoil for aircraft flight. In a folded position, the total wing span of the aircraft is reduced while it is on the ground. The wing tip is held in a spread position by at least one latch pin. A latch pin actuator of the present invention includes a housing that is mountable to one of the wing portions in a fixed relative position. A latch pin, generally in the form of a moving cylinder body, is reciprocable on a piston that is fixed to the housing. The cylindrical body and the piston define variable volume fluid chambers such that delivery of hydraulic fluid pressure causes the latch pin to slidably extend from and retract within the housing. A primary lock member has a pin-blocking portion that is movable between locked and unlocked positions. At least a portion of the pin-blocking portion is disposed across a path of travel of the latch pin when the primary lock is in the locked position.

The latch pin actuator may also include a sequencing valve and a hydraulic actuator operated by fluid hydraulic pressure to operate the primary lock member and the sequencing valve such that movement of the primary lock member from the locked position to the unlocked position causes the sequencing valve to deliver the hydraulic fluid pressure to retract the latch pin.

Because the latch pin is itself a travelling cylinder body, the latch pin is "pulled" into latching position by the fluid hydraulic pressure. This overcomes minor misalignment problems which would otherwise cause jamming or sticking of the latch pin.

A secondary lock member may be provided in the housing and movable between locked and unlocked positions. In the locked position, a pin-blocking portion of the secondary lock member is disposed across the path of travel of the latch pin. In preferred form, both the primary and secondary lock members are rotatable into a locked position such that movement of the latch pin against either lock member tends to bias it toward the locked position. Also in preferred form, both primary and secondary locks are spring biased toward a locked position.

A hydraulic actuator may be provided to move the primary lock between locked and unlocked positions. The hydraulic actuator may also operate a sequencing valve such that hydraulic pressure first operates the actuator to move the primary lock to an unlocked position and operates the sequencing valve to then deliver the hydraulic pressure to a chamber in the cylinder body of the latch pin to cause retraction of the latch pin into the housing.

According to another aspect of the invention, the secondary lock member may be mechanically linked to secondary lock members of other actuators such that they are ganged-together to be operated in unison by a separate power drive unit.

Another aspect of the present invention is to provide interacting inhibit cams on the primary and secondary lock members such that the secondary lock must be moved to the unlocked position prior to movement of the primary lock to the unlocked position. Conversely, the secondary lock member cannot be moved to a locked position until after the primary lock has been locked. When the secondary locks are mechanically linked in a ganged-together relationship, this assures that each independently-operating primary lock member is in the proper locked position prior to any secondary lock members being moved to a locked position.

Another feature provides that full retraction of the latch pin will mechanically displace an inhibit member which limits movement of the secondary lock member when biased into the unlock position. In this manner, position of the latch pin can be monitored by monitoring the position of the secondary lock member. Likewise, the position of all latch pins in a bank of latch pin actuators can be monitored by monitoring the position of ganged-together secondary lock members.

A grease delivery valve, which can be actuated by movement of the inhibit member can automatically control delivery of a lubricant from a reservoir to the exterior surface of the latch pin.

Other features, aspects and advantages of the present invention may be seen by close examination of the drawing, description of the best mode for carrying out the invention, and claims, all of which constitute a part of the present disclosure.

BRIEF DESCRIPTION OF THE DRAWINGS

Like reference numerals are used to represent like parts throughout the various figures of the drawing, wherein:

FIG. 6 is a fragmentary sectional view showing a spade and clevis connection of a folding wing tip in a spread position and in a latched and locked condition;

FIG. 7 is a fragmentary sectional view similar to that shown in FIG. 6 wherein the wing tip is in a folded position and the latch pin actuator is in an unlocked and unlatched condition;

FIGS. 10 and 11 are a schematic diagram of the latch pin and primary lock actuator;

FIG. 12 is a sectional view taken substantially along line 12—12 of FIG. 8 in a latched and locked condition;

FIG. 13 is a fragmentary sectional view taken substantially along line 13—13 of FIG. 12 and showing a secondary lock inhibit post and grease reservoir according to the present invention;

FIG. 15 is an exploded view of the ball stud connection shown in FIG. 14;

FIGS. 18–23 are sequential schematic diagrams showing the relationships between the latch pin, primary lock, and secondary lock during a fold operation; and FIGS. 24–29 are sequential schematic diagrams showing the relationships between the latch pin, primary lock, and secondary lock during a spread operation.

BEST MODE FOR CARRYING OUT THE INVENTION

Figure 1:
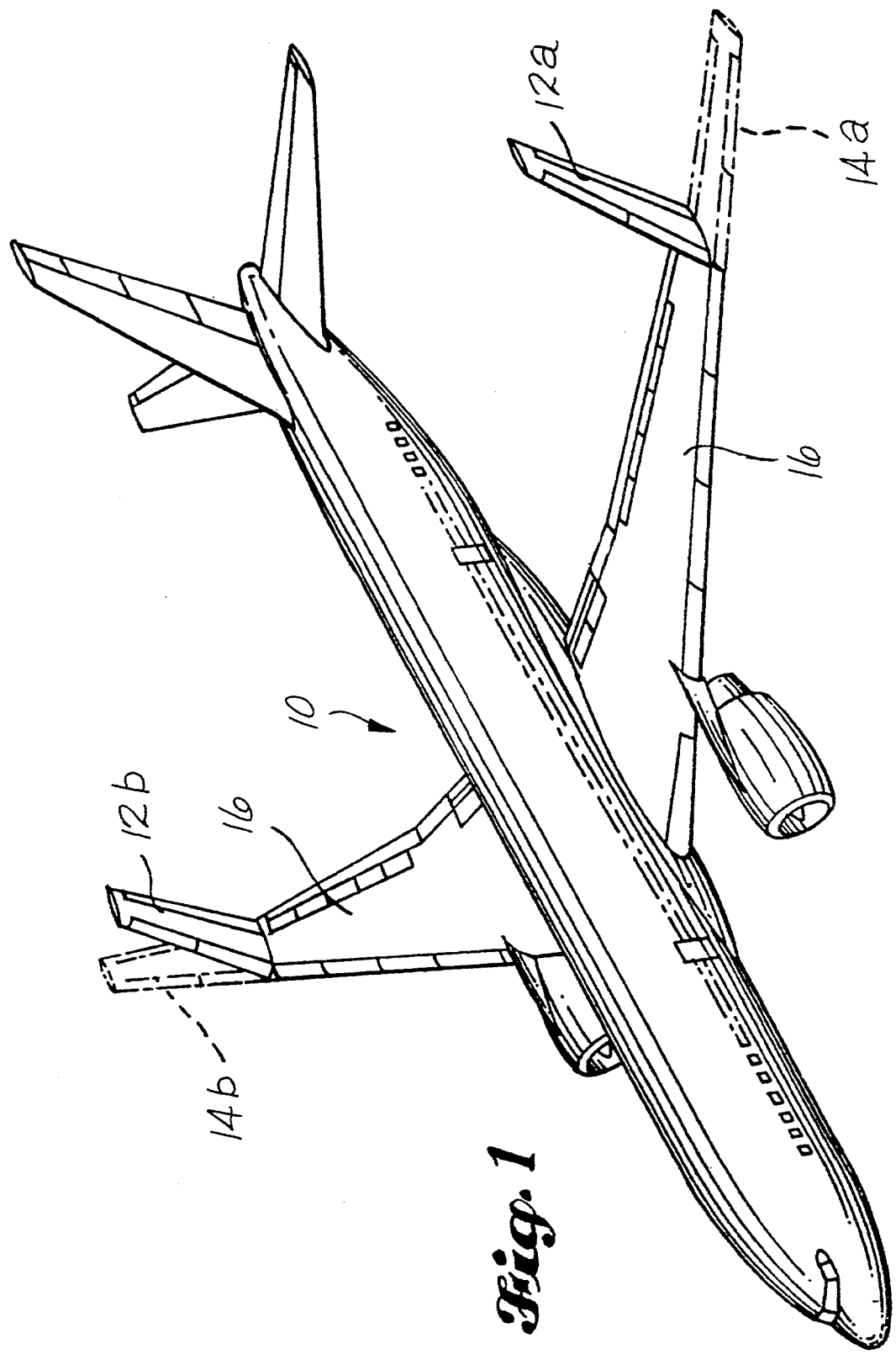
FIG. 1 is a pictorial view of a folding wing tip aircraft showing the wing tips in a folded position and with the spread position shown in phantom lines.

Referring first to FIG. 1, shown generally at 10 is a commercial jet airliner that is more or less conventional in configuration, except that it is provided with folding wing tips 12a, 12b. The solid lines show the wing tips 12a, 12b in an upwardly-folded position, for taxiing and parking, to load and offload passengers at a conventional airport terminal.

The dashed lines 14a, 14b show the same wing tips spread and locked into place with the wing inboard portions 16a, 16b for aircraft flight. The hydraulic lock pin actuators of the present invention are primarily for use in conjunction with the kind of aircraft shown in FIG. 1. It is to be understood, however, that such actuators may be well-suited for use in other kinds of aircraft, including those having military applications, and that the present invention may have other suitable applications.

Figure 2:
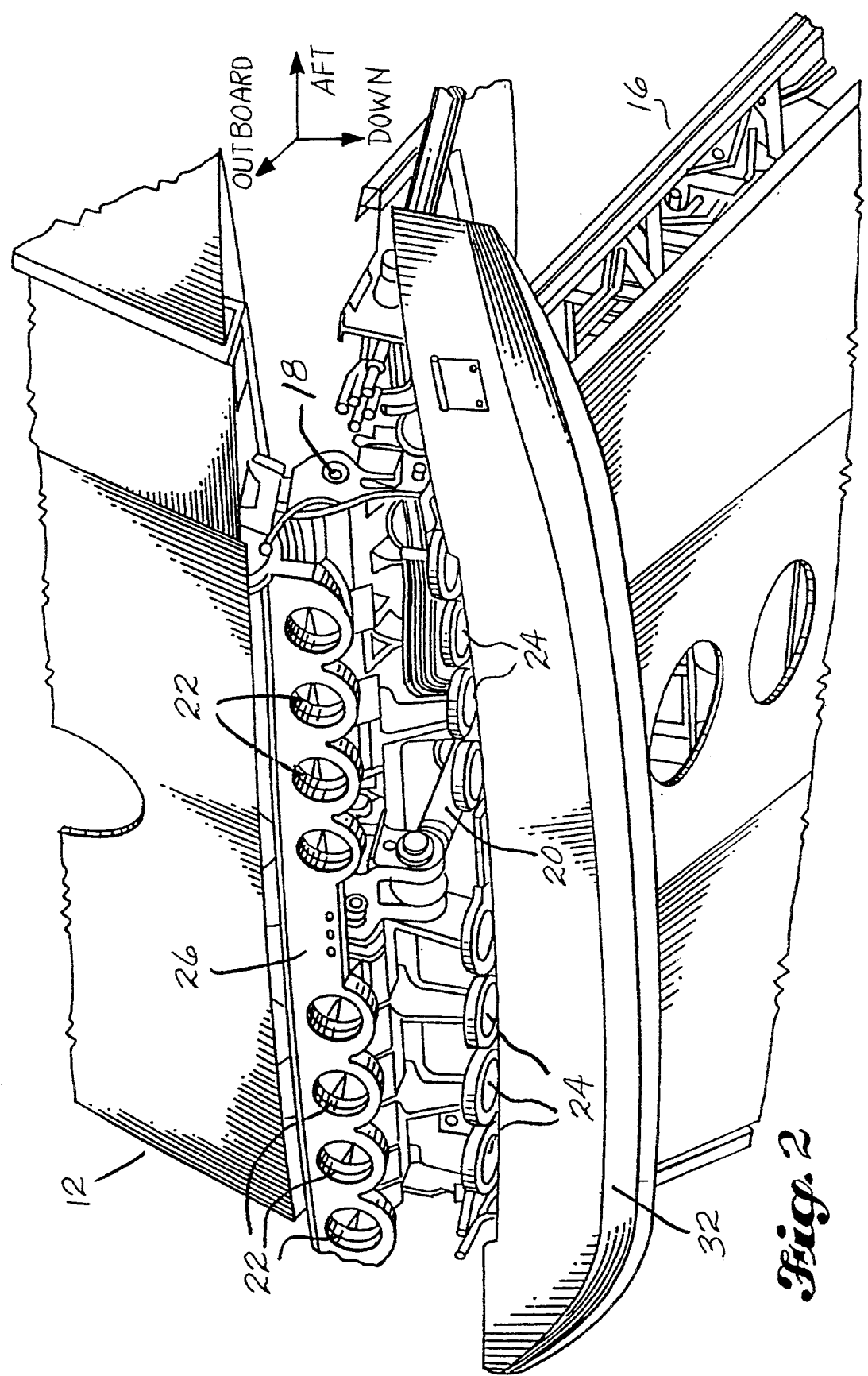
FIG. 2 is a fragmentary pictorial view of the hinge connection of a folded wing tip aircraft.

Referring now to FIG. 2, the wing tip structure 12 is mounted to the inboard portion 16 by a hinge structure 18. Such structure is identical for either wing, although as the skilled person would realize, the hinge structure for one wing would probably be mirrored in the other, corresponding to the fact that one wing is left-handed while the other is right-handed. Since the construction of either wing is substantially the same, the letter subscripts "a" and "b" used above to indicate left and right-handedness are deleted in FIG. 2 and from the other figures.

Folding and unfolding movement of the wing tip 12 relative to the wing inboard portion 16 is driven by a hydraulically-operated actuator 20. The wing tip 12 is locked in a folded condition by the actuator 20. The wing tip 12 is locked in a spread position by insertion of latch pins 21 (shown in FIGS. 3 and 4) through multiple openings 22, 24 in a lug and clevis-type connection. The lug is shown generally at 26 in FIGS. 2 and 3. The upper and lower leaves or tines of the clevis portion are shown generally at 28, 30. A fairing 32 which projects below the wing 16 houses latch pin actuators 34 of the present invention (shown in FIGS. 3, 4 and 5) as well as the hydraulic power drive unit 36 which operates the secondary locks of the latch pin actuators 34.

Retraction of the actuator 20 pulls the wing tip 12 downwardly until it is contiguous with the wing's inboard portion 16. In such position, both the tip 12 and the inboard portion 16 combine to form a single, continuous airfoil for flight. Conversely, extending the actuator 20 lifts or folds the wing tip 12. In accordance with the invention, this is done after the aircraft 10 has landed, so that its wingspan will be reduced, making the aircraft better suited for taxiing and parking adjacent other planes at an airport.

Figure 3:
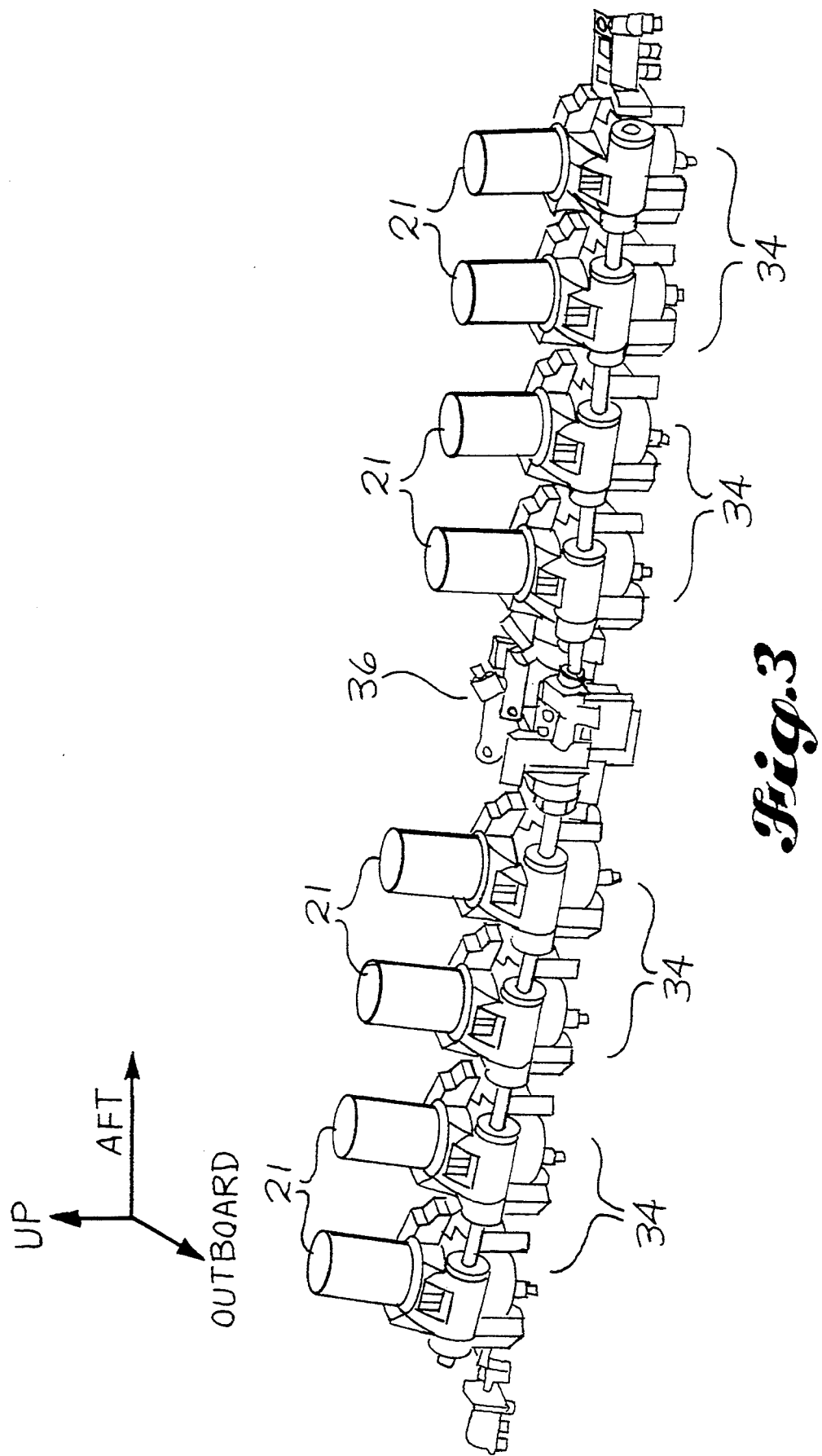
FIG. 3 is a pictorial view of fore and aft banks of latch pin actuators according to the present invention and including a centrally-positioned hydraulic power drive unit for operating secondary lock mechanisms.

The wing tip 12 is locked into the position shown in FIG. 6 by a plurality of latch pins 21 moved hydraulically into place by actuator units 34 (see FIG. 3). It is presently anticipated that eight individual latch pin actuator units 34 will be the preferred number for locking the wing tips Boeing 777 having folding wing capability. A lesser or greater number of units may be more suitable for other applications. The number of latch pin units 34 is not considered to be critical to the present invention, other than that in preferred form it is designed to be used in connection with a plurality of at least two such units. The preferred arrangement of the ganged plurality of units is shown generally in FIG. 3. The specific relationship between the units 34 will be discussed in some detail later.

The basic construction of each actuator unit 34 is shown in FIGS. 6–9. It should be understood that each actuator unit is substantially identical and, in preferred form, interchangeable.

Figure 8:
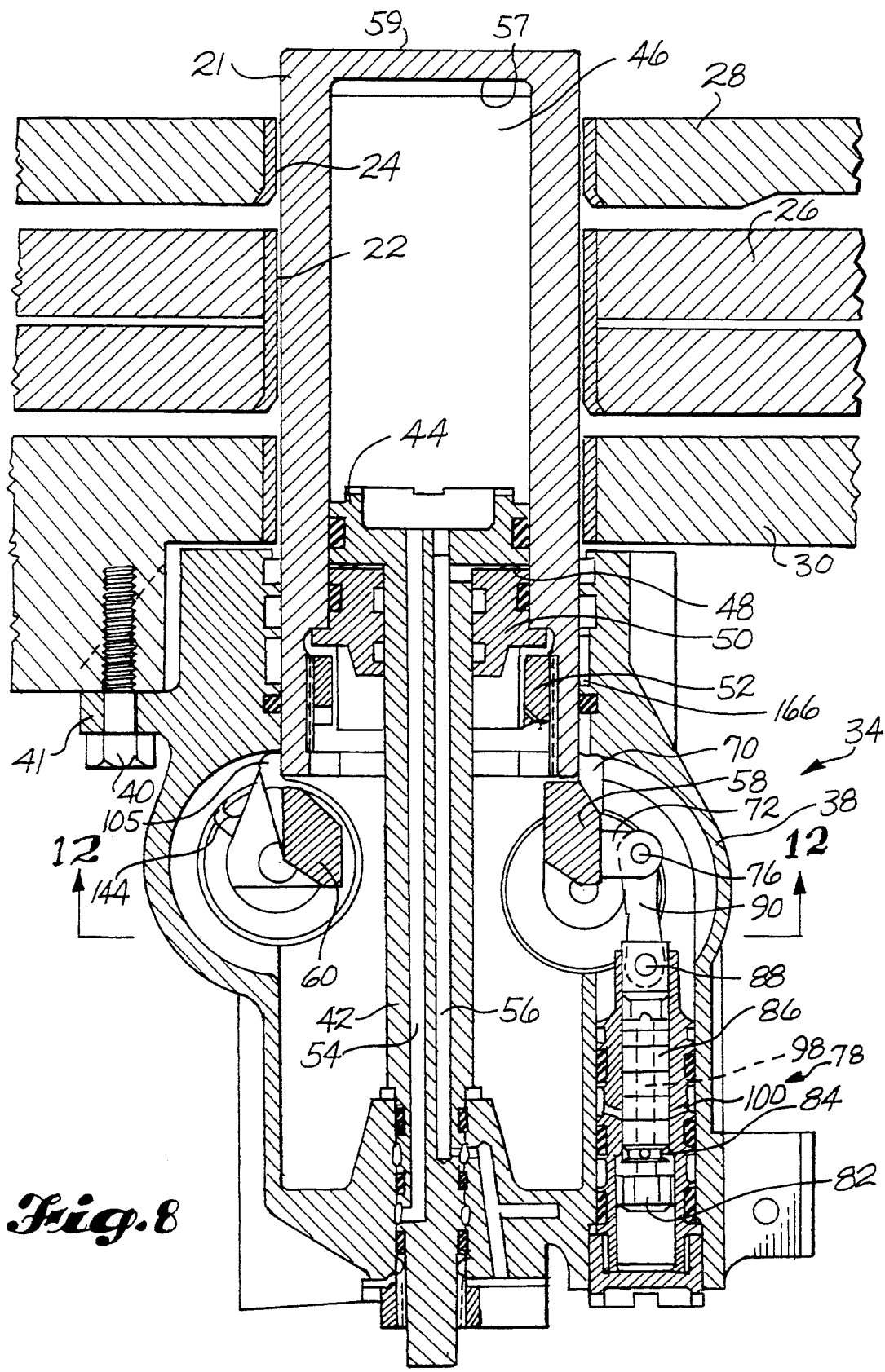
FIG. 8 is a detail sectional view of a latch pin actuator according to the present invention shown in a latched and locked condition.

Referring first to FIGS. 6, 7 and 8, each latch pin actuator unit 34 has a latch pin 21 that is slidingly received within actuator housing 38. The housing 38 is mountable by bolts 40 (FIG. 4), or similar means, which extend through mounting ears 41 to a lower tine or lug 30 of the clevis located at the outboard end of the fixed wing structure 16. It is to be understood that the position of the lug 26 or clevis (having two lugs 28, 30) may be interchanged, although the illustrated embodiment is preferred. The latch pin 21 is extended and retracted in and out of the housing 38 by hydraulic pressure.

Figure 9:
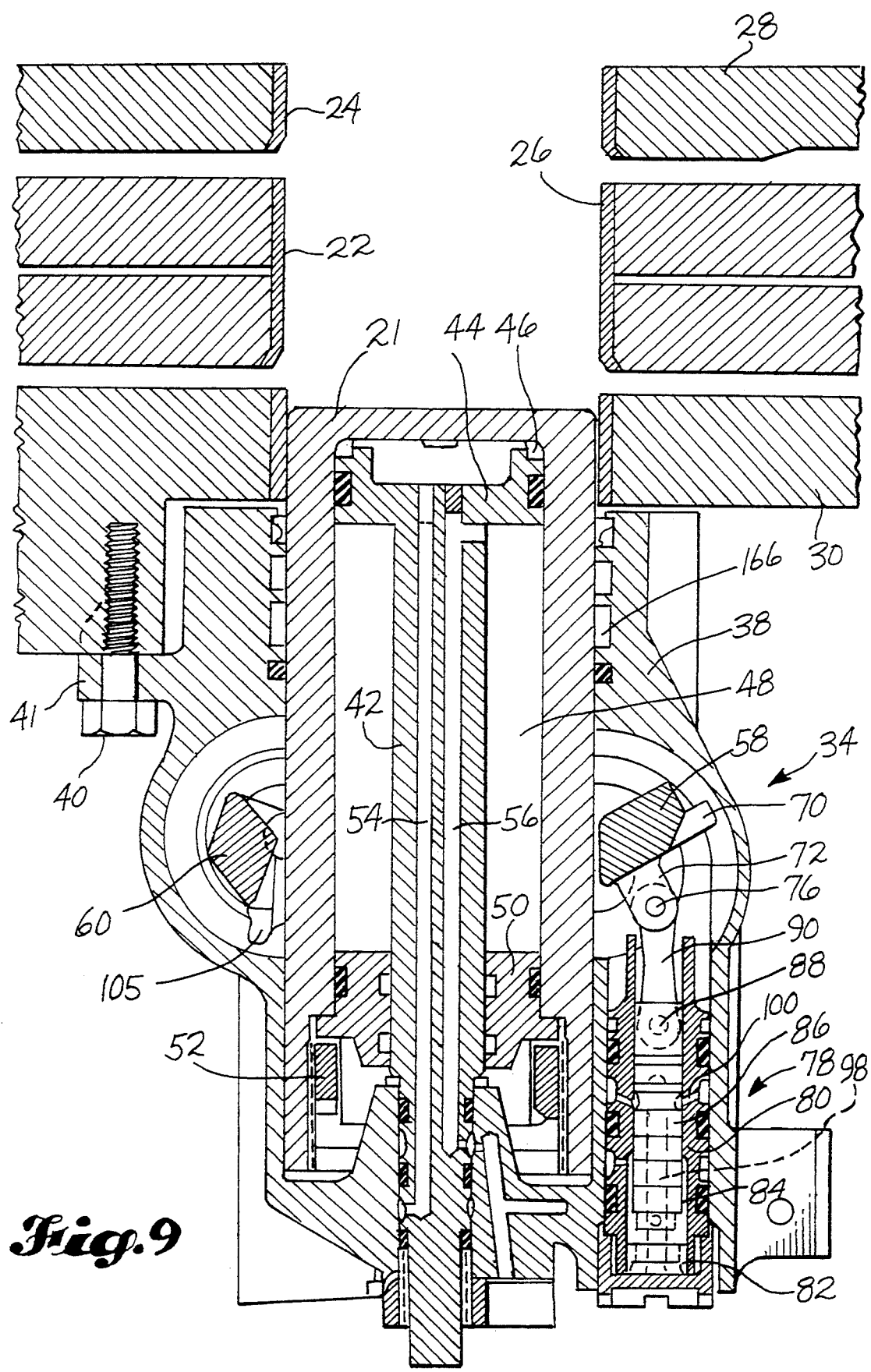
FIG. 9 is a view similar to FIG. 8 showing the latch pin actuator in an unlocked and unlatched condition.

In preferred form, a stem or piston rod 42 is fixedly connected to the housing 38 and extends generally along the centerline axis of the housing 38 and latch pin 21. The latch pin 21 itself is in the form of a travelling cylinder barrel. A piston head 44 is located at the free end of the rod 42 and divides the cylindrical latch pin 21 into two internal chambers 46, 48. The chamber 48 on the piston rod side of the piston head 44 is closed by a cylinder head 50 which is held in place by a threaded retainer nut 52. The stem or piston rod 42 is provided with internal fluid conduits 54, 56 through which hydraulic fluid pressure is delivered to and from each chamber 46, 48. Such fluid pressure is transferred by a hydraulic system onboard the aircraft in a manner that is conventional. Delivery of hydraulic fluid into the first chamber 46 through conduit 54 causes the latch pin 21 to be extended through the openings 22, 24 of the lug 26 and upper tine 28 of the clevis. This position is shown in FIGS. 6 and 8. Connecting conduit 54 to return and conduit 56 to pressure causes delivery of hydraulic fluid pressure to the second chamber 48, and the latch pin 21 is withdrawn. This position is shown in FIGS. 7 and 9.

An important aspect of the present invention is that, as previously mentioned, the latch pin 21 itself is in the form of a travelling cylinder barrel. In previously-known latching systems for folding wing aircraft, such as a U.S. Navy A-6 airplane, latch pins are "pushed" into latch holes. This is accomplished by having a separate linear hydraulic piston/cylinder unit which is axially spaced from the latch pin itself and is connected via a piston rod, or the like. In such a construction, the latch pin is being pushed from behind, which can accentuate or complicate any misalignment problems.

In contrast, the floating cylinder construction for the latch pin 21 of the present invention causes actuating fluid pressure to bear directly against an inner "cylinder head" surface 57 of the leading portion 59 of the latch pin 21. In this manner, the latch pin 21 is self-adjusting for slight misalignments and tends to be "pulled" into position by the hydraulic fluid pressure. When the latch pin 21 is being retracted, hydraulic pressure applies force to the cylinder head 50 which is then adjacent to the "leading" end of the latch pin 21.

The surface area against which hydraulic pressure bears in the first chamber 46 is greater than the surface area against which hydraulic pressure bears in the second chamber 48. This differential in surface area causes the latch pin 21 to be biased toward a "latched" position when hydraulic pressure is static or neutral to both chambers 46, 48. In this manner, an additional degree of safety is created by having the latch pin 21 always biased in default toward the "safe" position.

Referring now specifically to FIGS. 8 and 12, therein it can be seen that when the latch pin 21 is extended into a latched position, it can be securely locked in place by rotatable primary and secondary lock members 58, 60. The secondary lock 60 is mounted on a shaft having first and second opposite ends 62, 64. The ends 62, 64 extend outwardly of the housing 38 so that the secondary locks 60 of adjacent actuator units 34 may be ganged together for operation in unison. The connection of shafts 62, 64 between adjacent units 38 will be discussed in more detail in a separate part of this specification.

The primary lock 58 also rotates on a shaft having one end 66 which projects outwardly of the housing 38. An external inhibit lever 68 is mounted onto this end 66 of the shaft. The design and function of this inhibit lever 68 will be also described separately below.

Both the primary and secondary lock members 58, 60 are shaped such that rotation to a first position mechanically blocks retraction of the latch pin 21 into the housing 38 and rotation to another position will permit retraction of the latch pin 21.

In preferred form, as can be seen most clearly in FIG. 8, the primary lock 58 is spaced more closely to the cylinder of the latch pin 21 when in a latched and locked position than is the secondary lock 60. In this manner, settling of the latch pin 21 will be borne against the primary lock 58. Under normal circumstances, the secondary lock 60 will be protected from contact with the latch pin 21. It is intended that the secondary lock 60 will always be the first to unlock and the latter to lock. The secondary lock 60 is shaped, as shown, such that it can rotate between locked and unlocked positions without interference or contact with the latch pin 21. Both the primary and secondary lock members 58, 60 are designed to be "self-energizing." Each lock member 58, 60 rotates in a direction such that, if the latch pin 21 migrates out of the hole and contacts the lock 58, 60, the lock member 58, 60 will be pushed or rotated in the "locked" direction. As a result, pin migration cannot unlock the primary or secondary locks.

Rotation of the primary lock member 58 in the locked direction is limited by a stop member 70 which is positioned to contact either the base end of the latch pin 21 or an interior surface of the housing 38. The primary lock 58 includes a pair of radially-extending arms 72, 74 which, in preferred form, are enclosed within the housing 38. These arms 72, 74 are preferably in the form of a clevis or similar connection such that another member may be pivotally connected thereto. In preferred form, a single pivot pin 76 extends through both arms 72, 74.

The primary lock member 58 is moved from the locked position (FIG. 8) to the unlocked position (FIG. 9) by a single-acting piston/cylinder unit 78. A cylinder 80 is formed integrally with the housing 38 and a slidable piston 82 is located within the cylinder 80 to define a chamber 84 therein. A rod portion 86 extending from the piston 82 is pivotally connected (at 88) by a linkage 90 to the first arm 72 on the primary lock member 58. Substantially parallel to the piston/cylinder unit 78 is a compression-type spring (not shown) which is pivotally connected to the second arm 74, also by a pivoting linkage 92. Because the piston/cylinder unit 78 is single acting only and, therefore, is used only to move the primary lock member 58 from the locked position to the unlocked position, the aforementioned spring is used to move the primary lock member 58 from the unlocked position to the locked position. In this manner, the primary lock member 58 will remain biased toward the locked position when no hydraulic pressure or power is present.

According to one important aspect of the present invention, the latch pin 21 cannot be withdrawn from the clevis 28 and lug 26 until the secondary lock member 60 is first moved to its unlocked position, followed by movement of the primary lock member 58 to its unlocked position. This aspect of the present invention can be better understood by examination of FIGS. 10 and 11 which illustrate this feature schematically. FIG. 10 shows the actuator unit 34 in a latched and locked condition. FIG. 11 shows the actuator unit 34 in an unlocked and unlatching condition.

As will be described separately below with respect to the full operational sequence, an external secondary lock inhibit cam 94 prevents movement, by interference with an external primary lock inhibit cam 68, of the primary lock member 58 from a locked position to an unlocked position. After the secondary lock member 60 and inhibit cam 94 has been moved to an unlocked position, the primary lock 58 is mechanically free to move and the actuator 34 is commanded to unlatch by providing hydraulic pressure to an unlatch (UNLCH) supply line and connecting the hydraulic latch pressure (LCH) line to return.

UNLCH hydraulic pressure is not initially provided to conduit 56. Instead, UNLCH hydraulic pressure is delivered to chamber 84 of the previously-described piston/cylinder unit 78 causing the piston 82 to shift within the cylinder 80 and, thereby, rotating the primary lock member 58 from the locked position to an unlocked position, overcoming the spring tension which biased the primary lock member 58 to the locked position. In preferred form, a valve 96, such as a spool valve, is integrally formed with the rod portion 86 of the piston head 82. In this manner, after the primary lock member 58 has been fully shifted to its unlocked position, UNLCH hydraulic pressure is ported to the second chamber 48 of the latch pin cylinder 21 through conduit 56. As shown in FIGS. 8 and 9, an internal passageway 98 formed in the rod portion 86 will connect the chamber 84 with a port 100 in the cylinder wall 80 after the piston 82 has been fully shifted. This port 100 is operatively connected to convey hydraulic pressure to conduit 56.

The combined functions of actuating the primary lock member 58 and sequence valve 96 allow the primary lock and latch pin 21 both to be operated by a common pair of hydraulic lines. This provides the added safety benefit of making it physically impossible to hydraulically actuate the latch pin 21 prior to actuation of the primary lock 58. This could prevent damage to the lock members 58, 60 and will warn the flight crew of a hydraulic malfunction relating to the primary lock 58. Additionally, the using the LCH and UNLCH hydraulic supply lines to actuate the primary lock eliminates the need for an additional hydraulic circuit which would have to be extended along the entire length of the stationary wing portion 16 and into an already cramped location within the fairing 32.

As previously described, movement of the latch pin 21 into the latched position is achieved by providing LCH hydraulic pressure to the first chamber 46 of the latch pin 21 and connecting the UNLCH line to return. Bypass of the valve 96 is then provided through a check valve 102.

Referring now to FIG. 12, the structure and operation of the secondary lock member 60 will be described. The secondary lock 60 has a latch pin-blocking portion 104 which, when the secondary lock member 60 is in a locked position, extends transversely across the latch pin's 21 linear line of travel. The secondary lock member 60 includes a stop portion 105 which is positioned to bear against the latch pin 21 when the secondary lock 60 is biased toward the locked position. The secondary lock member 60 is normally biased toward the locked position by a torsion spring 107 mounted at the second end 64 of the secondary lock shaft. A separate torsion spring 107 is provided for each actuator unit 34 even though, because of the ganged-together relationship of the secondary lock member 60, each secondary lock member 60 will not operate independently.

The secondary lock member 60 also has an arcuate recess 106 which is sized and shaped to generally correspond to the outer curvature of the latch pin 21. Rotation of the secondary lock member 60 to an unlocked position correspondingly rotates the recess 106 into a position to allow retraction of the latch pin 21. In preferred form, the axis of rotation of the secondary lock member 60 intersects the arc defined by recess 106, as shown in FIG. 12.

Figure 4:
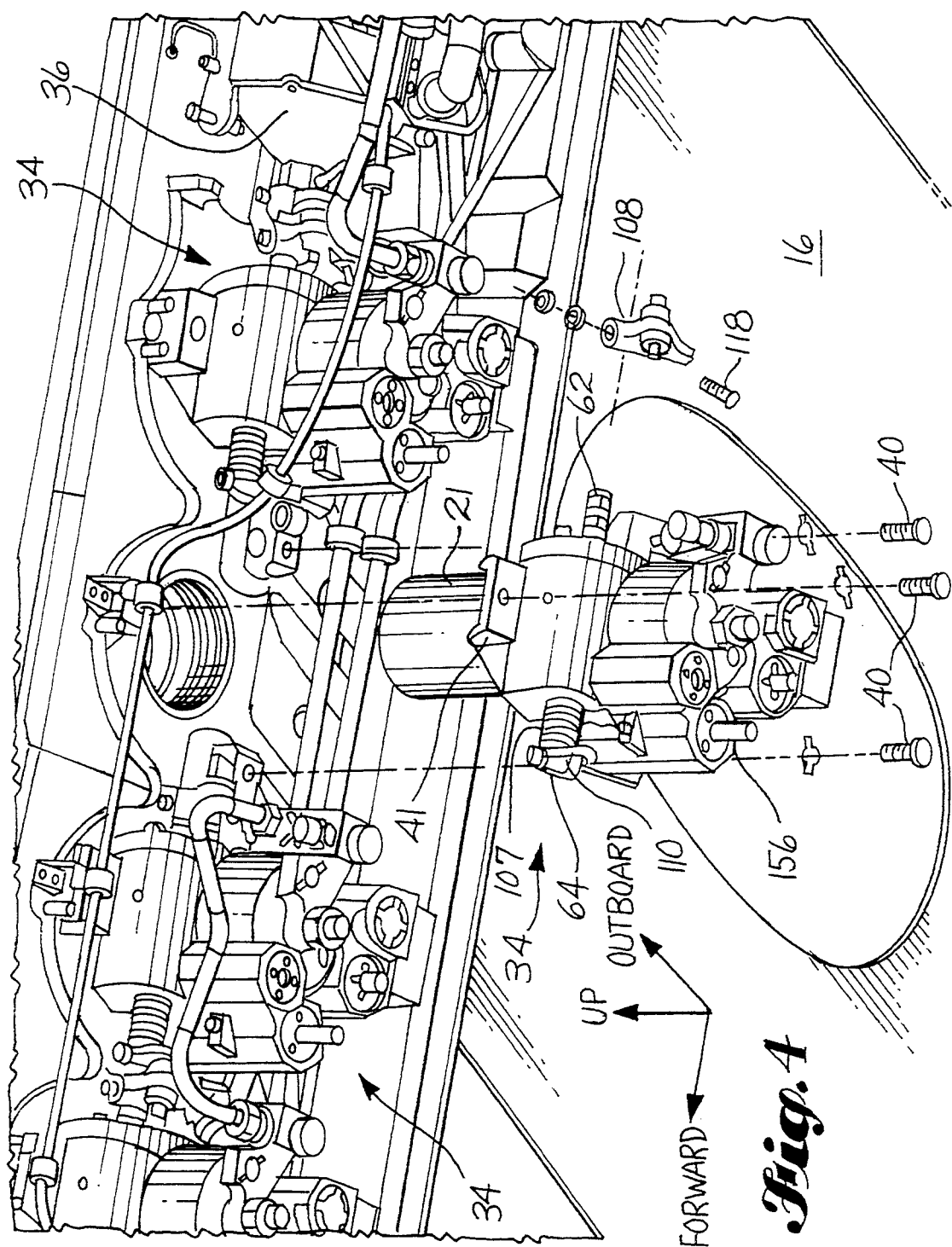
FIG. 4 is an underside, partially-exploded view of a hydraulic latch pin actuator according to the present invention shown in the environment of an airplane folding wing tip.
Figure 5:
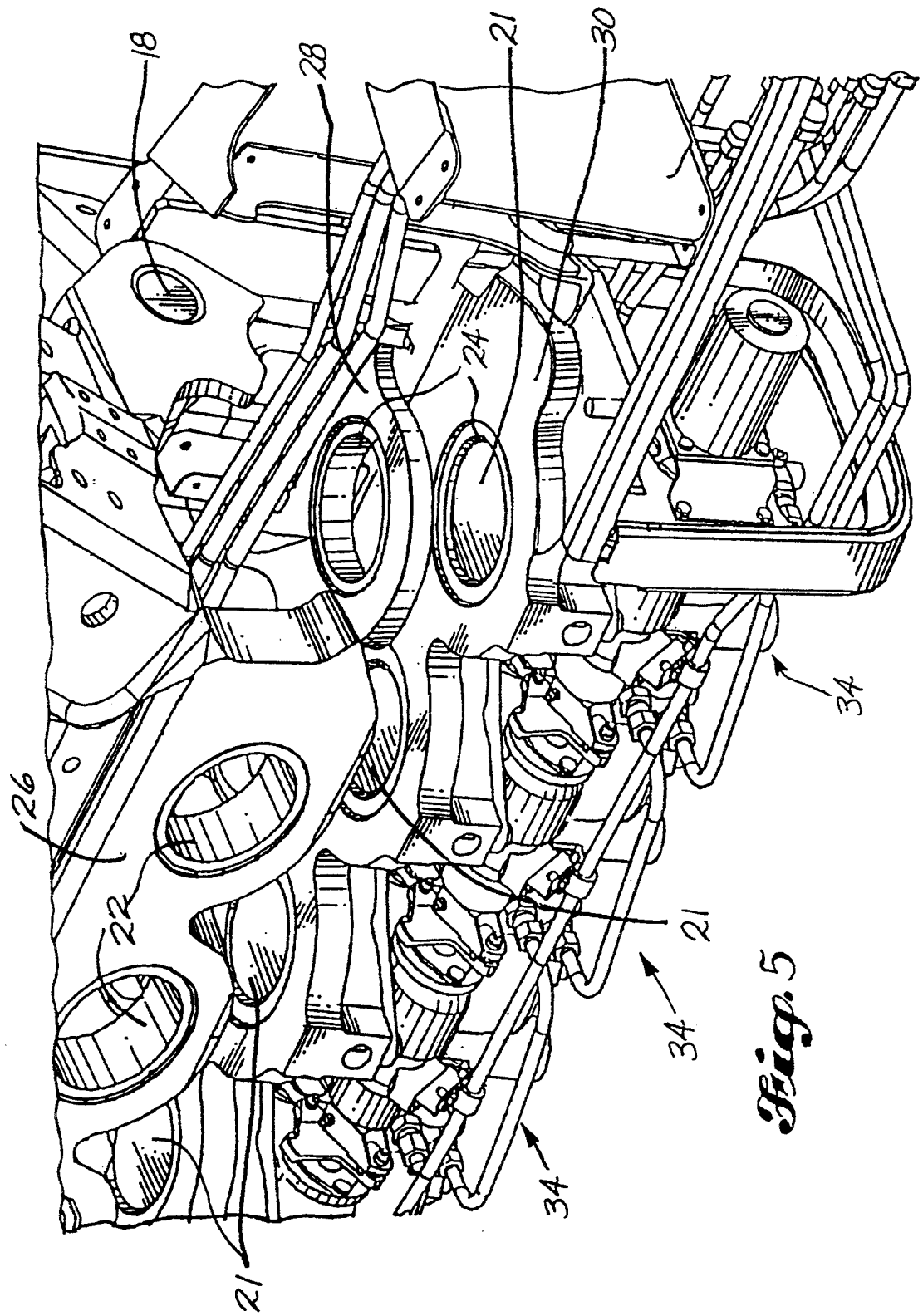
FIG. 5 is a fragmentary pictorial view of the hinge connection of a folded aircraft wing tip.

As illustrated in FIG. 4, each actuator unit 34 is installable and removable as a separate unit. This feature facilitates maintenance in the event that replacement or repair of a single unit 34 is required. However, when all of the actuator units 34 are installed properly, all of the secondary lock members 60 are drivingly interconnected in a ganged-together relationship. This is also shown in FIGS. 3 and 5. Connection of secondary lock members 60 between adjacent actuator units 34 is achieved by connection of the outwardly-extending shaft portions 62, 64 of adjacent units 34. However, because of the bank of units is slightly curved due to the airfoil shape of the wing 12, 16, connection must be made by a joint which provides adequate swivel movement.

Figure 14:
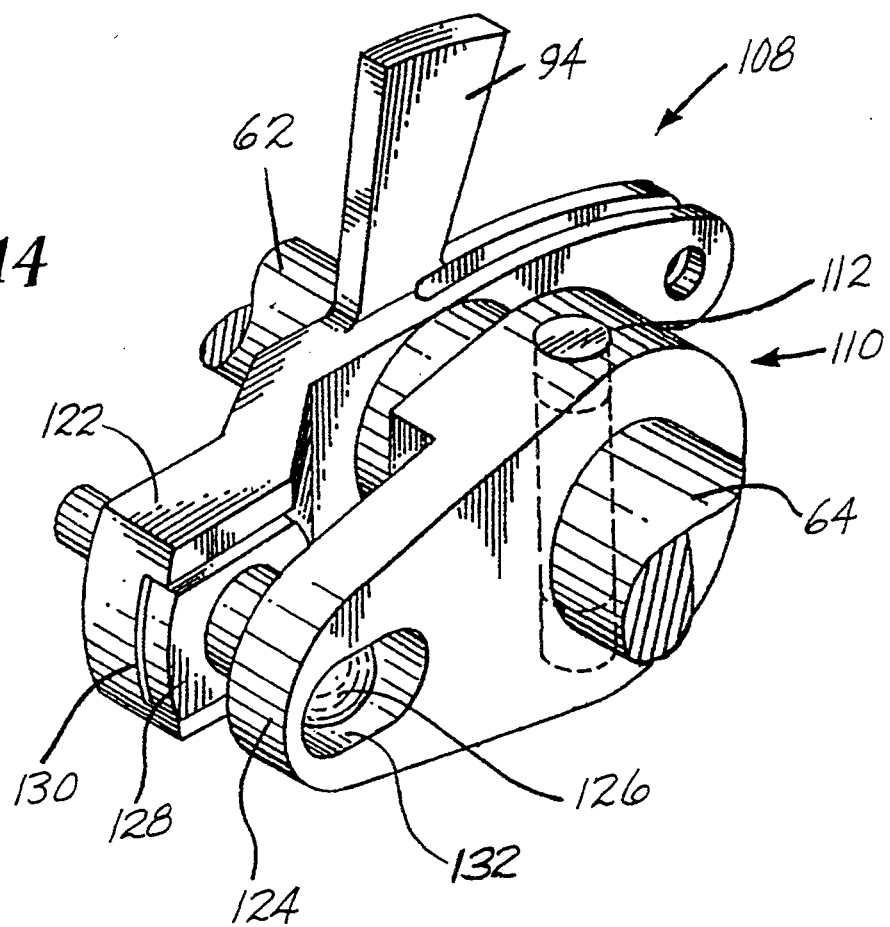
FIG. 14 is a pictorial view of a ball stud connection in the drive train of the latch pin actuator secondary lock mechanism.

A preferred form of this connection is shown in FIGS. 14 and 15. First and second connectors 108, 110 are connected to outward ends of the secondary lock member's shaft ends 62, 64, respectively. Appropriate attachment may be made in a variety of ways including by a spline fit as illustrated between connector 108 and shaft 62, or by an attachment pin 112 extending through aligned openings 114, 116, 118 in the connector 110 and shaft end 64. Frictional fit between the connector member 108 and the shaft end 62 may be enhanced by providing a spline connection in which a conventional screw 119 is used to close or tighten a split portion 120 of the connector 108. The particular means of attachment is not considered to be a critical part of the present invention.

In order to facilitate swivel connection between the shaft ends 62, 64, each connector 108, 110 includes a flange portion 122, 124 which is radially offset from the axis of its respective shaft end 62, 64. In preferred form, a ball stud or ball and socket-type connection is made between the flange portions 122, 124 of adjacent connector members 108, 110. A ball stud 126 is mounted on one connector member 108 and may include a base 128 which is sized and shaped to fit within a receiving groove 130 on the flange portion 122. This type of connection causes the ball stud 126 to be rotatably fixed relative to the shaft end 62, but allows some radial adjustment relatively thereto. The ball stud 126 is positioned to engage within a socket-type opening 132 in the flange portion 124 of the other connector member 110.

Rotation of the ganged-together secondary lock members 60 is provided by an independent hydraulic power drive unit 36. In this manner, operation of the secondary lock member 60 is fully independent of operation of the primary lock members 58. In preferred form, as shown in FIGS. 3 and 4, the power drive unit (PDU) 36 is positioned centrally between two banks of latch pin actuator units 34. If desired, the PDU 36 may be positioned at any point along the line of actuator units 34, including at either extreme end. Although not deemed desirable, especially due to space limitations, the PDU 36 could even be axially offset from the aligned bank of actuator units 34.

According to another aspect of the invention, an inhibit post, the position of which is shifted by end of stroke unlatching movement of the latch pin 21, may be used to inhibit or control the "unlocked" position of the ganged-together secondary lock members 60. Referring to FIG. 13, the preferred embodiment includes a latch pin-controlled inhibit post 134 which is spring biased 136 into a first or inhibiting position. The inhibit post 134 is axially slidable on a central guide member 138 and within a cylindrical guide opening 140 formed in the housing 38. One end 142 of the inhibit post 134 is positioned to cause interfering contact with a cam portion or stop 144 on the secondary lock member 60. As previously described, the inhibit post 134 is spring biased into this first position. Rotation of the secondary lock member 60 from a locked position to an unlocked position while the latch pin 21 is in a latched position is limited by contact of the stop portion 144 with the end 142 of the inhibit post 134. The inhibit post 134 includes a flange portion 146 at an opposite end which is positioned to be contacted by and axially displaced by retraction of the latch pin 21. This relationship is illustrated in FIG. 12. The flange 146 is positioned so that the inhibit post 134 is displaced only as the latch pin 21 is reaching its fully-unlatched position. When the inhibit post 134 is displaced, the first end 142 of the inhibit post 134 is shifted away from its inhibiting position in which the stop member 144 is blocked. At this time, the secondary lock member 60 which is still being biased toward an unlocked position by the PDU 36 is allowed to rotate approximately another 30° to 35°. Due to a feature which does not constitute any part of the present invention, a position monitor in the PDU 36 will detect this further rotation and signal to the control system that all latch pins 21 are fully unlatched. As previously described, because the secondary lock members 60 are ganged together, this further amount of rotation is not permitted until each inhibit post 134 in every actuator unit 34 of the gang has been displaced. Such displacement allows rotation of all secondary lock members 60 from an "unlocked" position to an "unlocked and unlatched" position.

According to yet another feature of the present invention, the latch pin actuator 34 may be self-lubricating. As is well understood in the field of hydraulics, seals and bearings which are internal of a hydraulic piston/cylinder unit are self-lubricating. This lubricating function is performed by the hydraulic fluid itself. The external surface of the latch pin 21 of the present invention, which is itself a travelling cylinder barrel, is guided for retraction and extension movement into and out of the unit housing 38. Rather than using a relatively light lubricant such as hydraulic fluid, a heavy grease is used to lubricate the exterior surface of the latch pin 21 as it extends into and out of housing 38, as well as through the tines 28, 30 of the clevis and the lug 26. Latch pins of the Navy A-6 airplane are greased by Navy maintenance personnel every twenty-eight days. This would be a significant burden to a commercial airline company. The present invention provides a self-actuating grease delivery system to each latch pin 21.

A variable volume grease reservoir 148 is provided within the housing 38. A plunger 150 is provided within the cylindrical reservoir 148 and is biased in one axial direction by a pair of springs 152, 154. The reservoir 148 may be pressure filled with an appropriate type and amount of grease lubricant, displacing the plunger 150 against the springs 152, 154. The force of the springs 152, 154 causes the grease placed in the reservoir 148 to remain under pressure. An indicator post 156 extends axially outwardly from the plunger 150 such that a portion is visibly exposed beyond the confines of the housing 38. As grease in the reservoir 148 is used, the plunger 150, and in turn the indicator post 156, are moved. When the indicator post 156 is no longer visible outside the housing 38, this indicates to maintenance personnel that the reservoir 148 needs to be refilled. A first conduit 158 connects the grease reservoir 148 to an annular chamber 160 adjacent the inhibit post 134. A second conduit 162 operatively extends between another annular chamber 164 surrounding the inhibit post 134 and an annular lubricant-delivering chamber 166 which encircles the latch pin 21. An internal passageway 168 in the inhibit post 134 operates to connect conduit 158 and chamber 160 to chamber 164 and conduit 162 each time it is deplaced by retraction of the latch pin 21. A predetermined amount of grease in the reservoir 148 is delivered under pressure to the annular chamber 166 during each stroke of the latch pin 21. In this manner, it is assured that each latch pin 21 is properly lubricated and maintenance by ground crews is significantly reduced.

Operation of the latch pin actuator 34 during fold and spread sequences will now be described below.

FOLD SEQUENCE

Referring now to FIGS. 18–23, specific steps in the fold operation sequence will be described. Each of the figures shown in the sequence schematically illustrates the position and condition of the latch pin 21, primary lock 58, secondary lock 60, external lock inhibit cams 68, 94 and latch pin inhibit post 134. Although only one latch pin actuator 34 of what would normally be an in-line bank of such actuators is shown, it is to be understood that each latch pin actuator 34 would be identically operated and controlled.

Figure 16:
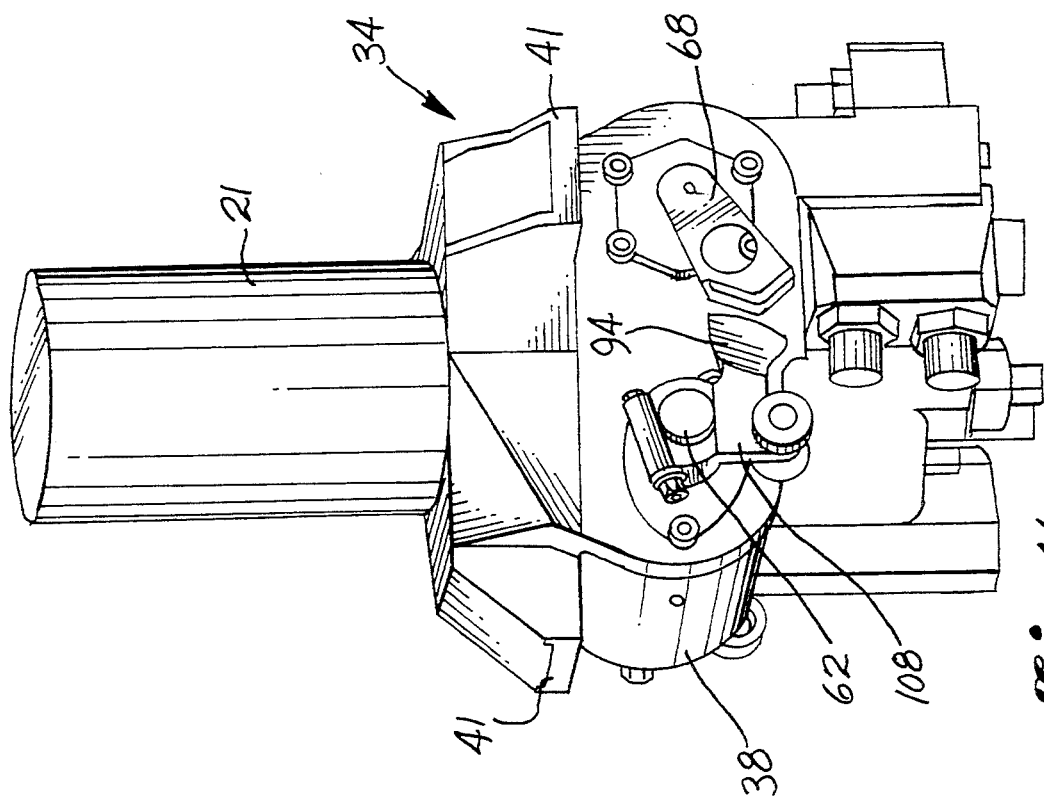
FIG. 16 is a pictorial view of a latch pin actuator according to the present invention showing the mechanical interference projections between primary and secondary locks, shown in a latched and locked condition.

FIG. 18 schematically shows the actuator 34 in a latched and locked condition and with no hydraulic pressure applied to the unit. This is also illustrated in FIG. 16. In this condition, the wing tip 12 is spread for take-off, flight or landing. Absent applied hydraulic force, the latch pin 21 may have settled slightly and be resting on the primary lock 58.

Referring to FIG. 19, the fold sequence is initiated. After landing, and during taxiing toward a gate, the pilot can arm the wing tip fold system. Typically, this requires the system to sense that the landing gear is carrying the weight of the airplane and that the airplane is taxiing at less than a predetermined maximum speed. These safety checks having been made, latch pressure (LCH) is applied to the latch pin 21, biasing the latch pin 21 in the direction shown by the arrow. In this manner, a latch pin 21 which may have settled onto or against the primary lock 58 is moved away. According to a feature of the overall invention, latch hydraulic pressure (LCH) must be applied prior to initiation of the unlock and unlatch sequence.

Referring to FIG. 20, the secondary lock 60 is rotated approximately 135° by the PDU 36 unit into an unlocked position. In this position, an internal stop 144 on the secondary lock 60 contacts the latch pin inhibit post 134. The control system senses, based on rotation of the PDU 36, that the secondary locks 60 are unlocked, but that the latch pin 21 is still in a latched condition.

Figure 17:
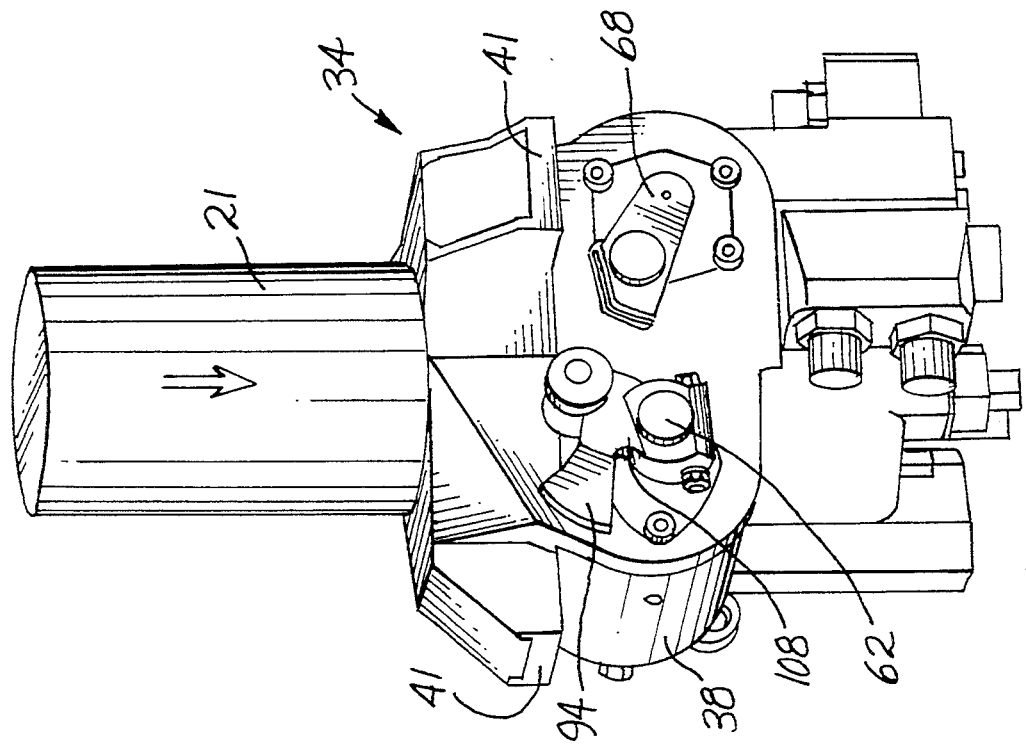
FIG. 17 is a view similar to FIG. 16, showing the latch pin actuator in a latched, but unlocked condition.

Referring to FIG. 21, unlatch hydraulic pressure (UNLCH) is then sent to the latch pin actuator 34 first causing the primary lock 58 to be rotated approximately 120° into an unlocked position. This is also illustrated in FIG. 17. As previously described, actuation of the primary lock 58 simultaneously opens a control valve 96 which ports hydraulic pressure into the rod side chamber 48 of the hydraulic cylinder latch pin 21, causing it to retract into an unlatched position. Upon full retraction, the base end of the latch pin contacts the base flange 146 of the latch pin inhibit post 134, shifting it axially a distance sufficient to allow the previously-described stop 144 on the secondary lock 60 to rotate approximately 30° further. This further rotation of the secondary locks 60 is sensed by the PDU 36 and indicates to the system that every latch pin 21 has been fully retracted.

Referring to FIG. 22, the fold actuator 20 is then commanded to fold. When fold has been accomplished and the fold actuator 20 has locked in the folded position, the power drive unit 36 operating the secondary locks 60 is then commanded to reverse toward a locked position. An external secondary lock inhibit cam 94 is then biased against an external primary lock inhibit cam 68, limiting rotation of the secondary lock 60 to approximately 440. Referring to FIG. 23, when all hydraulic power is removed from the latch pin actuator 34 and secondary lock power drive unit 36, the primary and secondary locks 58, 60 remain spring biased toward a locked position. The primary lock 58 is allowed to move approximately 13.25° from its fully-unlocked position. This is important because, after some time in an idle condition, the latch pins 21 may tend to migrate toward a latched position.

SPREAD SEQUENCE

Referring to FIGS. 24–29, therein is shown schematically the position and condition of the latch pin 21, primary lock 58, secondary lock 60, external lock inhibit cams 68, 94 and latch pin inhibit post 134 during the spread operation sequence.

FIG. 24 shows the actuator in a disarmed state. Both primary and secondary locks 58, 60 are spring biased toward a locked position. The primary lock 58 is limited in rotation by contact with the latch pin 21. Rotation of the secondary lock 60 is limited by contact of inhibit cam 94 against inhibit cam 68. Referring to FIG. 25, once the system is armed, the secondary lock power drive unit 36 is initially commanded to bias the secondary locks 60 toward a locked position. Unlatch hydraulic pressure (UNLCH) is sent to the latch pin actuator 34 causing any latch pins 21 which may have migrated toward a latched position during the disarmed state to be fully retracted to the unlatched position and causing the primary locks 58 to be hydraulically biased toward an unlocked position.

Referring to FIG. 26, the PDU 36 is commanded to rotate the secondary locks 60 toward the unlocked position. When all latch pins 21 have been fully retracted, each displacing an inhibit post 134, the secondary lock 60 moves to the "fully unlocked and unlatched" position. Then, wing tip spread is commanded. The hydraulic actuators 20 which control the position of the wing tips 12 from the folded position to the spread position then move the wing tips 12.

Referring to FIG. 27, during the spreading operation of the wing tips 12, the PDU 36 is commanded to bias the secondary locks 60 toward the locked position. The external lock inhibit cams 68, 94 of the primary and secondary locks 58, 60 limit movement of the secondary locks 60. The primary lock 58 "drags" against the outer surface of the latch pin 21.

Referring to FIG. 28, when system sensors indicate that the wing tip 12 is fully spread, i.e. the connecting lug is fully engaged in the latching clevis, hydraulic pressure is applied to the cylinder end chamber 46 of the hydraulic cylinder latch pin 21 causing it to move through the clevis and lug openings 22, 24 into a latched position. As the latch pin 21 clears the primary lock 58, the primary lock 58 is spring biased to rotate into the locked position. The lock inhibit cam 68 of the primary lock 58 is allowed to roll along the secondary lock inhibit cam 94. This feature allows detection of any primary lock spring failure. Rotation of the secondary locks 60, the position of which is monitored by the control system, is prevented by the failure of any one primary lock 58 to move to the locked position. Detection of a primary lock spring failure is important because it is this spring which holds the primary lock 58 in place during flight.

Referring to FIG. 29, the secondary lock 60 is then biased by the PDU 36 into a locked position. Premature rotation of the secondary lock 60 is prevented by the lock inhibit cam 94 which requires that all primary locks 58 be in place prior to allowing any of the ganged-together secondary locks 60 to rotate into position. Full rotation of the ganged-together secondary locks provides the system with an indication that every latch pin 21 is fully latched, every primary lock 58 has been spring biased into position, and every secondary lock 60 is in a locked condition. In this position, the external lock inhibit cam 94 of the secondary lock 60 prevents unlocking movement of the primary lock 58.

It will be understood by one skilled in the art that many variations, adaptations, or changes could be made to the disclosed preferred embodiment without departing from the spirit and scope of the present invention. For this reason, patent protection is not to be limited by or to what is illustrated herein and described above. Instead, patent protection is defined by the following claim or claims, properly interpreted according to accepted doctrines of claim interpretation, including the doctrine of equivalents and reversal of parts.

What is claimed is:

1. For use on an aircraft having folding wing tips, where an end portion of each aircraft wing is hingedly connected to an inboard portion of said wing, in a manner so that said end portion is swingable between a spread position, where it and said inboard portion together form a contiguous airfoil for aircraft flight, and a folded position, for reducing the total wing span of said aircraft when it is on the ground, said wing tip being held in a spread position by at least one latch pin, a latch pin actuator, comprising:

a housing that is mountable to one of said wing portions and fixed in position relative thereto;

a latch pin that is generally in the form of a moving cylinder body and reciprocable on a piston that is fixed to said housing, said cylindrical body and said piston defining variable volume fluid chambers such that delivery of hydraulic fluid pressure causes said latch pin to slidably extend from and retract within said housing;

a primary lock member having a pin-blocking portion that is movable between locked and unlocked positions, at least a portion of said pin-blocking portion being disposed across a path of travel of said latch pin when said pin-blocking portion is in said locked position; and wherein said primary lock is moved between said locked and unlocked positions by a hydraulic actuator and further comprising a sequencing valve, such that hydraulic pressure operates said actuator and said sequencing valve such that upon movement of said primary lock from said locked position to said unlocked position, said hydraulic pressure is then delivered to one of said chambers in the cylinder body of said latch pin to cause retraction of said latch pin into said housing.

2. The latch pin actuator of claim 1, wherein said primary lock is rotated into said locked position such that retracting movement of said latch pin against said lock member tends to bias it toward the locked position.

3. The latch pin actuator of claim 1, wherein said primary locking member is spring biased toward a locked position.

4. The latch pin actuator of claim 1, further comprising a lubrication-delivering valve which is operated by full retraction of said latch pin to deliver a lubricant from a reservoir to an exterior surface of said latch pin.

5. For use on an aircraft having folding wing tips, where an end portion of each aircraft wing is hingedly connected to an inboard portion of said wing, in a manner so that said end portion is swingable between a spread position, where it and said inboard portion together form a contiguous airfoil for aircraft flight, and a folded position, for reducing the total wing span of said aircraft when it is on the ground, said wing tip being held in a spread position by at least one latch pin, a latch pin actuator, comprising:
- a housing that is mountable to one of said wing portions and fixed in position relative thereto;
- a latch pin that is generally in the form of a moving cylinder body and reciprocable on a piston that is fixed to said housing, said cylindrical body and said piston defining variable volume fluid chambers such that delivery of hydraulic fluid pressure causes said latch pin to slidably extend from and retract within said housing;
- a primary lock member having a pin-blocking portion that is movable between locked and unlocked positions, at least a portion of said pin-blocking portion being disposed across a path of travel of said latch pin when said pin-blocking portion is in said locked position; and
- further comprising a secondary lock member in said housing and movable between a locked position in which a pin-blocking portion is disposed across the path of travel of said latch pin and an unlocked position.

6. The latch pin actuator of claim 5, including connecting means for mechanically linking said secondary lock member of said actuator with a lock member of a second latch pin actuator.

7. The latch pin actuator of claim 5, further comprising interacting inhibit cams on said primary and secondary lock members such that said primary lock member is mechanically inhibited from movement to its unlocked position until after said secondary lock member has been moved to its unlocked position and such that said secondary lock member cannot be moved to its locked position until after said primary lock has been moved to its locked position.

8. The latch pin actuator of claim 7, wherein said interacting inhibit cams are located externally of said housing.

9. The latch pin actuator of claim 5, further comprising a latch pin position monitor including an inhibit member which is mechanically displaced by full retraction of said latch pin, said inhibit member limiting movement of said secondary lock member when biased toward its unlocked position and not inhibiting when displaced by said latch pin.

10. The latch pin actuator of claim 5, wherein the pin blocking portion of said primary lock member, in its locked position, is positioned closer to the latch pin than the pin blocking portion of said secondary lock member in its locked position.

11. For use on an aircraft having folding wing tips, where an end portion of each aircraft wing is hingedly connected to an inboard portion of said wing, in a manner so that said end portion is swingable between a spread position, where it and said inboard portion together form a contiguous airfoil for aircraft flight, and a folded position, for reducing the total wing span of said aircraft when it is on the ground, said wing tip being held in a spread position by at least one latch pin, a latch pin actuator, comprising:
- a housing mountable to one of said wing portions;
- a latch pin that is reciprocally movable between an extended and retracted condition relative to said housing;
- a primary lock member positioned in said housing and movable between a locked position in which a pin-blocking portion is disposed across a path of travel of said latch pin and an unlocked position;
- a sequencing valve; and
- a hydraulic actuator operated by fluid hydraulic pressure to operate said primary lock member and said sequencing valve such that movement of said primary lock member from said locked position to said unlocked position causes said sequencing valve to deliver said hydraulic fluid pressure to retract said latch pin.

12. For use on an aircraft having folding wing tips, where an end portion of each aircraft wing is hingedly connected to an inboard portion of said wing, in a manner so that said end portion is swingable between a spread position, where it and said inboard portion together form a contiguous airfoil for aircraft flight, and a folded position, for reducing the total wing span of said aircraft when it is on the ground, said wing tip being held in a spread position by at least one latch pin, a latch pin actuator, comprising:
- a housing that is mountable to one of said wing portions and fixed in position relative thereto;
- a latch pin that is generally in the form of a moving cylinder body and reciprocable on a piston that is fixed to said housing, said cylindrical body and said piston defining variable volume fluid chambers such that delivery of hydraulic fluid pressure causes said latch pin to slidably extend from and retract within said housing;
- a primary lock member having a pin-blocking portion that is movable between locked and unlocked positions, at least a portion of said pin-blocking portion being disposed across a path of travel of said latch pin when said pin-blocking portion is in said locked position; and
- further comprising interacting inhibit cams on said primary and secondary lock members such that said primary lock member is mechanically inhibited from movement to its unlocked position until after said secondary lock member has been moved to its unlocked position and such that said secondary lock member cannot be moved to its locked position until after said primary lock has been moved to its locked position.

13. The latch pin actuator of claim 12, wherein said interacting inhibit cams are located externally of said housing.

14. The latch pin actuator of claim 12, further comprising a latch pin position monitor including an inhibit member which is mechanically displaced by full retraction of said latch pin, said inhibit member limiting movement of said secondary lock member when biased toward its unlocked position and not inhibiting when displaced by said latch pin.

* * * * *